US012725328B2

(12) United States Patent

Inala et al.

(10) Patent No.: US 12,725,328 B2

(45) Date of Patent: Sep. 1, 2026

(54) DYNAMICALLY SYNTHESIZED USER INTERFACE WIDGETS

(71) Applicant: Microsoft Technology Licensing, LLC, Redmond, WA (US)

(72) Inventors: Jeevana Priya Inala, Hillsboro, OR (US); Chenglong Wang, Bellevue, WA (US); Priyan Vaithilingam, Boston, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 18/533,674

(22) Filed: Dec. 8, 2023

(65) Prior Publication Data

US 2025/0190230 A1 Jun. 12, 2025

(51) Int. Cl.

| | |
|---|---|
| ***G06T 11/26*** | (2026.01) |
| ***G06F 3/0484*** | (2022.01) |
| ***G06F 8/30*** | (2018.01) |
| ***G06F 8/35*** | (2018.01) |
| ***G06F 8/38*** | (2018.01) |
| ***G06F 9/451*** | (2018.01) |

(Continued)

(52) U.S. Cl.

CPC ............ *G06T 11/26* (2026.01); *G06F 3/0484* (2013.01); *G06F 8/31* (2013.01); *G06F 8/35* (2013.01); *G06F 8/38* (2013.01); *G06F 9/451* (2018.02); *G06F 40/40* (2020.01); *G06N 3/0475* (2023.01)

(58) Field of Classification Search

CPC ........ G06T 11/206; G06F 3/0484; G06F 8/31; G06F 8/35; G06F 8/38; G06F 9/451; G06F 40/40; G06N 3/0475

See application file for complete search history.

(56) References Cited

U.S. PATENT DOCUMENTS

| | | | | |
|---|---|---|---|---|
| 11,138,518 | B1 * | 10/2021 | Yu | G06F 9/44526 |
| 2019/0250891 | A1 * | 8/2019 | Kumar | G06F 8/38 |
| 2020/0089700 | A1 * | 3/2020 | Ericson | G06F 40/30 |

(Continued)

FOREIGN PATENT DOCUMENTS

| | | | | |
|---|---|---|---|---|
| CN | 114398034 A | * | 4/2022 | G06T 11/26 |

OTHER PUBLICATIONS

Stephen Collins, Crafting Prompt Templates for Code Generation, https://stephencollins.tech/posts/crafting-prompt-templates-for-code-generation (Year: 2023).*

(Continued)

*Primary Examiner* — Justin R. Blaufeld

(74) *Attorney, Agent, or Firm* — Schwegman Lundberg & Woessner, P.A.

(57) ABSTRACT

Systems for dynamically synthesizing widgets for chart modification are provided. A method can include receiving data indicating a dataset of structured data. The data can be provided by a user through a user interface (UI). The UI can display the data on a chart. A request can be received by the UI. The request can be provided by the user. The request can indicate an alteration to a representation of the data on the chart. A widget can be dynamically synthesized based on the request. The widget can be operable to alter the representation of the data on the chart based on user interaction with the widget. The UI can present the widget on the UI alongside the chart. The chart can be altered based on user interaction with the widget.

14 Claims, 15 Drawing Sheets

(51) Int. Cl.
*G06F 40/40* (2020.01)
*G06N 3/0475* (2023.01)

(56) References Cited

U.S. PATENT DOCUMENTS

| | | | | |
|---|---|---|---|---|
| 2020/0319872 | A1* | 10/2020 | Yu | H04L 67/34 |
| 2022/0382524 | A1* | 12/2022 | Ansari | G06F 8/33 |
| 2023/0011807 | A1* | 1/2023 | Gunda | G06F 16/252 |
| 2023/0115185 | A1* | 4/2023 | Huang | G06F 40/279 |
| 2023/0138367 | A1* | 5/2023 | Song | G06N 3/047 706/15 |
| 2023/0280985 | A1* | 9/2023 | Hayashi | G06F 8/30 |
| 2023/0342116 | A1* | 10/2023 | Dibia | G06F 8/35 |
| 2023/0409298 | A1* | 12/2023 | Ciminelli | G06F 8/38 |
| 2024/0329820 | A1* | 10/2024 | Zheng | G06N 3/0464 |

OTHER PUBLICATIONS

Victor Dibia, LIDA: A Tool for Automatic Generation of Grammar-Agnostic Visualizations and Infographics using Large Language Models (Jun. 6, 2023), https://arxiv.org/abs/2303.02927v3 (Year: 2023).*
International Search Report and Written Opinion received for PCT Application No. PCT/US2024/057582, Mar. 14, 2025, 14 pages.
Victor Dibia, "LIDA: A Tool for Automatic Generation of Grammar-Agnostic Visualizations and Infographics using Large Language Models", arXiv:2303.02927v2, Jun. 2, 2023, 27 pages.
Vaithilingam, et al., "DynaVis: Dynamically Synthesized UI Widgets for Visualization Editing", In Repository of arXiv:2401.10880v1, Jan. 19, 2024, 24 pages.
"D3 by Observable.", Retrieved from: https://d3js.org/, Retrieved Date: Oct. 3, 2023, 4 Pages.
"Explore data, deliver insights, and take action with Tableau AI", Retrieved from: https://www.tableau.com/, Retrieved Date: Oct. 3, 2023, 2023, 08 Pages.
"ggplot2", Retrieved from: https://ggplot2.tidyverse.org/, Retrieved Date: Oct. 3, 2023, 6 Pages.
"Natural Language AI", Retrieved from: https://cloud.google.com/natural-language?hl=en, Retrieved Date: Oct. 3, 2023, 6 Pages.
"pandas documentation", Retrieved from: https://pandas.pydata.org/docs/index.html, Oct. 26, 2023, 2 Pages.
"Spacy", Retrieved from: https://spacy.io/, Retrieved Date: Oct. 3, 2023, 10 Pages.
"Turn your Data into Immediate Impact", Retrieved from: https://web.archive.org/web/20230503230022/https://powerbi.microsoft.com/en-us/, May 3, 2023, 14 Pages.
"Welcome to Apache OpenNLP", Retrieved from: https://opennlp.apache.org/, Retrieved Date: Oct. 3, 2023, 2 Pages.
Belinkov, et al., "Analysis methods in neural language processing: A survey", In Journal of Transactions of the Association for Computational Linguistics, vol. 7, Mar. 2019, pp. 49-72.
Brockman, et al., "OpenAI API", Retrieved from: https://openai.com/blog/openai-api, Jun. 11, 2020, 16 Pages.
Buck, et al., "Introduction: Use Natural Language to Explore Data with Power BI Q&A", Retrieved from: https://learn.microsoft.com/en-us/power-bi/natural-language/q-and-a-intro, Sep. 30, 2023, 6 Pages.
Budiu, Raluca, "Memory Recognition and Recall in User Interfaces", Retrieved from: https://www.nngroup.com/articles/recognition-and-recall/, Jul. 6, 2014, 12 Pages.
Chen, et al., "Type-directed synthesis of visualizations from natural language queries", In Proceedings of the ACM on Programming Languages, vol. 6, Oct. 31, 2022, 28 Pages.
Crotty, et al., "Vizdom: Interactive Analytics through Pen and Touch", In Proceedings of the VLDB Endowment, vol. 8, Issue 12, Aug. 1, 2015, pp. 2024-2027.
Dhamdhere, et al., "Analyza: Exploring Data with Conversation", In Proceedings of the 22nd International Conference on Intelligent User Interfaces, Mar. 13, 2017, pp. 493-504.
Dibia, et al., "Data2Vis: Automatic Generation of Data Visualizations Using Sequence-to-Sequence Recurrent Neural Networks", In Journal of IEEE Computer Graphics and Applications, vol. 39, Issue 5, Sep. 1, 2019, pp. 33-46.
Dibia, Victor, "LIDA: A Tool for Automatic Generation of Grammar-Agnostic Visualizations and Infographics using Large Language Models", In Repository of arXiv:2303.02927v1, Mar. 6, 2023, 12 Pages.
Fischer, et al., "DIY assistant: A Multi-modal End-User Programmable Virtual Assistant", In Proceedings of the 42nd ACM SIGPLAN International Conference on Programming Language Design and Implementation, Jun. 19, 2021, pp. 312-327.
Gajos, et al., "Automatically Generating user Interfaces Adapted to users' Motor and Vision Capabilities", In Proceedings of the 20th annual ACM symposium on User interface software and technology, Oct. 7, 2007, pp. 231-240.
Gajos, et al., "SUPPLE: Automatically Generating User Interfaces", In Proceedings of the 9th International Conference on Intelligent User Interfaces, Jan. 13, 2004, pp. 93-100.
Gao, et al., "DataTone: Managing Ambiguity in Natural Language Interfaces for Data Visualization", In Proceedings of the 28th Annual ACM Symposium on User Interface Software and Technology, Nov. 8, 2015, pp. 489-500.
Lee, et al., "You Can't Always Sketch What You Want: Understanding Sensemaking in Visual Query Systems", In Proceedings of IEEE Transactions on Visualization and Computer Graphics, vol. 26, Issue 1, Jan. 2020, pp. 1267-1277.
Li, et al., "Pumice: A multi-modal agent that learns concepts and conditionals from natural language and demonstrations", In Proceedings of the 32nd annual ACM symposium on user interface software and technology, Oct. 20, 2019, pp. 577-589.
Liu, et al., "Data Illustrator: Augmenting Vector Design Tools with Lazy Data Binding for Expressive Visualization Authoring", In Proceedings of the CHI Conference on Human Factors in Computing Systems, Apr. 21, 2018, pp. 1-13.
Loper, et al., "NLTK: The Natural Language Toolkit", In Repository of arXiv:cs/0205028v1, May 17, 2002, 8 Pages.
Lukes, et al., "Synthesis of Web Layouts from Examples", In Proceedings of the 29th ACM Joint Meeting on European Software Engineering Conference and Symposium on the Foundations of Software Engineering, Aug. 23, 2021, pp. 651-663.
Luo, et al., "Deepeye: Creating good data visualizations by keyword search", In Proceedings of the International Conference on Management of Data, Jun. 10, 2018, pp. 1733-1736.
Manning, et al., "The Stanford CoreNLP Natural Language Processing Toolkit," in Proceedings of 52nd Annual Meeting of the Association for Computational Linguistics: System Demonstrations, Jun. 2014, pp. 55-60.
Markas, Ruhaab, "Ask Data: Simplifying analytics with natural language", Retrieved from: https://www.tableau.com/blog/ask-data-simplifying-analytics-natural-language-98655, Nov. 26, 2018, 6 Pages.
Moritz, et al., "Formalizing Visualization Design Knowledge as Constraints: Actionable and Extensible Models in Draco", In Journal of IEEE Transactions on Visualization and Computer Graphics, vol. 25, Issue 1, Aug. 20, 2018, pp. 438-448.
Narechania, et al., "NL4DV: A Toolkit for Generating Analytic Specifications for Data Visualization from Natural Language Queries", In Journal of IEEE Transactions on Visualization and Computer Graphics, vol. 27, Issue 2, Feb. 2021, pp. 369-379.
Nichols, et al., "Huddle: Automatically Generating Interfaces for Systems of Multiple Connected Appliances", In Proceedings of the 19th Annual ACM Symposium on user Interface Software and Technology, Oct. 15, 2006, 10 Pages.
Nichols, et al., "Personal Universal Controllers: Controlling Complex Appliances With GUIs and Speech", In Extended Abstracts on Human Factors in Computing Systems, Apr. 5, 2003, pp. 624-625.
Nichols, et al., "UNIFORM: Automatically Generating Consistent Remote Control user Interfaces", In Proceedings of the SIGCHI conference on Human Factors in computing systems, Apr. 22, 2006, pp. 611-620.
Nielsen, Jakob, "10 Usability Heuristics for User Interface Design", Retrieved from: https://www.nngroup.com/articles/ten-usability-heuristics/, Apr. 24, 1994, 17 Pages.

(56) References Cited

OTHER PUBLICATIONS

Norman, et al., "User Centered System Design: New Perspectives on Human-Computer Interaction", In Publication of CRC Press; 1st edition, Jan. 1, 1986.
Ren, et al.' "Charticulator: Interactive Construction of Bespoke Chart Layouts", In Journal of IEEE transactions on Visualization and Computer Graphics vol. 25, Issue 1, Aug. 20, 2018, pp. 789-799.
Satyanarayan, et al., "Lyra: An Interactive Visualization Design Environment", In Computer Graphics Forum, vol. 33, Jul. 12, 2014, 10 Pages.
Satyanarayan, et al., "Vega-Lite: A grammar of interactive graphics", In Journal of IEEE Transactions on Visualization and Computer Graphics, vol. 23, Issue 1, Jan. 2017, pp. 341-350.
Setlur, et al., "Eviza: A Natural Language Interface for Visual Analysis", In Proceedings of the 29th Annual Symposium on user Interface Software and Technology, Oct. 16, 2016, pp. 365-377.
Shen, et al., "Towards Natural Language Interfaces for Data Visualization: A Survey", In Journal of IEEE Transactions on Visualization and Computer Graphics, vol. 29, Jun. 2023, pp. 3121-3144.
Siddiqui, et al., "ShapeSearch: A Flexible and Efficient System for Shape-based Exploration of Trendlines", In Proceedings of the 2020 ACM SIGMOD International Conference on Management of Data, Jun. 11, 2020, pp. 51-65.
Srinivasan, et al., "Natural Language Interfaces for Data Analysis with Visualization: Considering What Has and Could Be Asked", In Proceedings of the Eurographics/IEEE VGTC Conference on Visualization: Short Papers, Jun. 2017, pp. 55-59.
Vaithilingam, et al., "Bespoke: Interactively Synthesizing Custom GUIs from Command-line Applications by Demonstration", In Proceedings of the 32nd Annual ACM Symposium on user Interface Software and Technology, Oct. 17, 2019, pp. 563-576.
Wang, et al., "Towards Natural Language-Based Visualization Authoring", In Journal of IEEE Transactions on Visualization and Computer Graphics, vol. 29, Issue 1, Jan. 2023, pp. 1222-1232.
Whitenton, Kathryn, "The Two UX Gulfs: Evaluation and Execution", Retrieved from: https://www.nngroup.com/articles/two-ux-gulfs-evaluation-execution/, Mar. 11, 2018, 12 Pages.
Wilkinson, Leland, "The Grammar of Graphics, Second Edition", In Publication of Springer, 2005, 693 Pages.
Wongsuphasawat, et al., "Voyager 2: Augmenting Visual Analysis with Partial View Specifications", In Proceedings of the 2017 Chi Conference on Human Factors in Computing Systems, May 2, 2017, pp. 2648-2659.
Young, et al., "Recent Trends in Deep Learning Based Natural Language Processing", In Journal of IEEE Computational Intelligence Magazine, vol. 13, Issue 3, Jul. 18, 2018, pp. 55-75.
Yu, et al., "FlowSense: A Natural Language Interface for Visual Data Xxploration Within a Dataflow System", In Proceedings of IEEE Transactions on Visualization and Computer Graphics, vol. 26, Issue 1, Jan. 2020, pp. 1-11.
Zamfirescu-Pereira, et al., "Why Johnny Can't Prompt: How Non-AI Experts Try (and Fail) to Design LLM Prompts", In Proceedings of CHI Conference on Human Factors in Computing Systems, Apr. 23, 2023, 21 Pages.
Zgraggen, et al., "Panoramicdata: Data analysis through pen & touch", In Journal of IEEE transactions on Visualization and Computer Graphics, Dec. 31, 2014, 10 Pages.
Zhang, et al., "Sato: Contextual Semantic Type Detection in Tables", In Publication of arXiv:1911.06311v1, Nov. 14, 2019, 14 Pages.
International Preliminary Report on Patentability (Chapter I) received for PCT Application No. PCT/US2024/057582, mailed on Jun. 18, 2026, 09 pages.

* cited by examiner

1010 — RECEIVE, BY A USER THROUGH A USER INTERFACE (UI), DATA INDICATING A DATASET OF STRUCTURED DATA

1012 — DISPLAY, BY THE UI, THE DATA ON A CHART

1014 — RECEIVE, BY THE UI, A REQUEST FROM THE USER TO ALTER A REPRESENTATION OF THE DATA ON THE CHART

1016 — DYNAMICALLY SYNTHESIZE A WIDGET OPERABLE TO ALTER THE REPRESENTATION OF THE DATA ON THE CHART BASED ON USER INTERACTION WITH THE WIDGET

1018 — PRESENT, BY THE UI, THE WIDGET ON THE UI ALONGSIDE THE CHART

1020 — ALTER, BASED ON USER INTERACTION WITH THE WIDGET, THE CHART

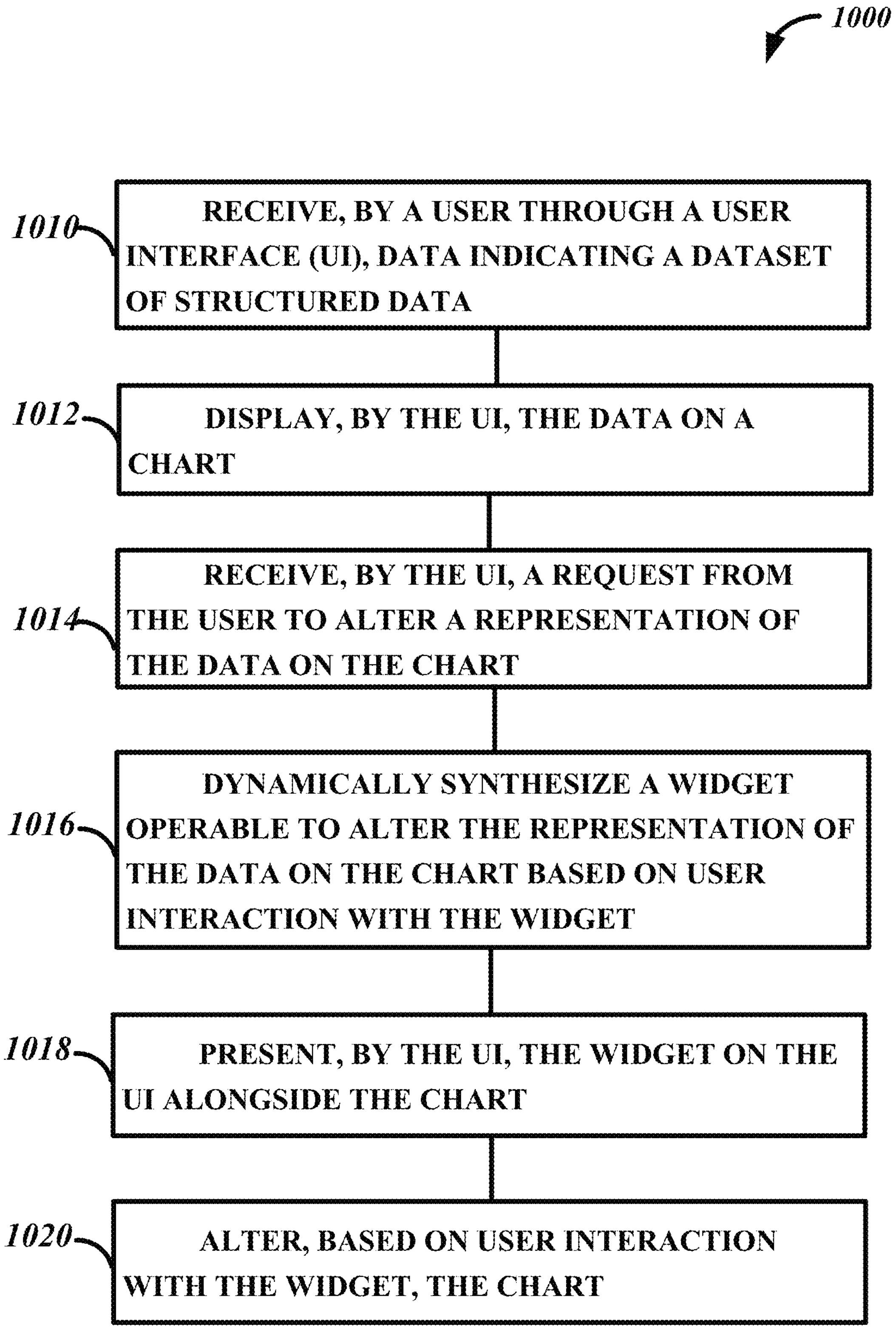

*FIG. 10*

DYNAMICALLY SYNTHESIZED USER INTERFACE WIDGETS

BACKGROUND

Interactive visualization (e.g., chart or other graphic) authoring tools (e.g., Tableau from Tableau Software of Seattle, Washington, United States of America, PowerBI from Microsoft Corporation of Redmond, Washington, United States of America, Lyra from the University of Washington Interactive Data Lab, and Charticulator from Microsoft Corporation) have greatly reduced the effort to create initial visualizations from data. With these tools, authors only need to specify high-level mappings from data fields to visual properties, and "behind the scenes", these tools automatically provide "smart defaults" to fill in visualization parameters. The tools hide the low-level details that are provided as smart defaults.

While these smart defaults are often sufficient for exploratory analysis, authors usually want to refine the visualization to better communicate their insights. Readers may want to customize the visualization to answer their analysis objectives and often find themselves in need of editing these default visualizations. For example, to prevent longer labels from overlapping in a line chart, the author has to rotate the labels in x-axis, or the user will have to add a filter to only include data within a given date range.

These edits are often considered "small tweaks" of the visualization, but these edits can be very challenging to achieve. First, the user needs to distinguish which options will lead to the desired editing effect (e.g., understand that they need the "tick" option as opposed to "scale" or "legend" to edit label angle), which requires expertise on low-level visualization grammar. Then, the user needs to discover the edit option in the tool which may be buried in tiers of menus and panels among all others in a tool graphical user interface (GUI). The user needs to right click the x-axis to open its property editor, locate the sub-panel on ticks, find the rotation option to change the label angle, which can be challenging to achieve without sufficient tool expertise. As a result, users either are either presented with a complex UI where they are swamped with options, or a tailored interface designed to simplify navigation where they often find themselves too restricted to perform a customization.

SUMMARY

Embodiments regard circuits, devices, and methods for providing dynamically generated user interface (UI) widgets. A method can include receiving data indicating a dataset of structured data. The data can be provided by a user through a user interface (UI). The UI can display the data on a chart. A request can be received by the UI. The request can be provided by the user. The request can indicate an alteration to a representation of the data on the chart. A widget can be dynamically synthesized based on the request. The widget can be operable to alter the representation of the data on the chart based on user interaction with the widget. The UI can present the widget on the UI alongside the chart. The chart can be altered based on user interaction with the widget.

Dynamically synthesizing the widget can include prompting a large language model (LLM) to fill in code of code templates resulting in templates with completed code. The templates with completed code include visualization code that defines how the widget appears on the UI, and callback function code that calls a visualization specification of the chart and the visualization code. The request can be provided in natural language through a widget input control. The request can be provided in natural language through an input control. The request can further indicate a modification to the chart.

The method can further include concurrently performing the modification to the chart along with presentation of the widget on the UI. The method can further include pre-processing the dataset resulting in a data summary. Prompting the LLM can further include providing the code templates along with the data summary to the LLM. Prompting the LLM can further include providing few shot examples along with the prompt.

A machine-readable medium, system, device, or a combination thereof can be configured to implement the method.

BRIEF DESCRIPTION OF THE DRAWINGS

FIG. 10 illustrates, by way of example, a diagram of an embodiment of a method for dynamically synthesizing UI widgets.

DETAILED DESCRIPTION

Figure 1:
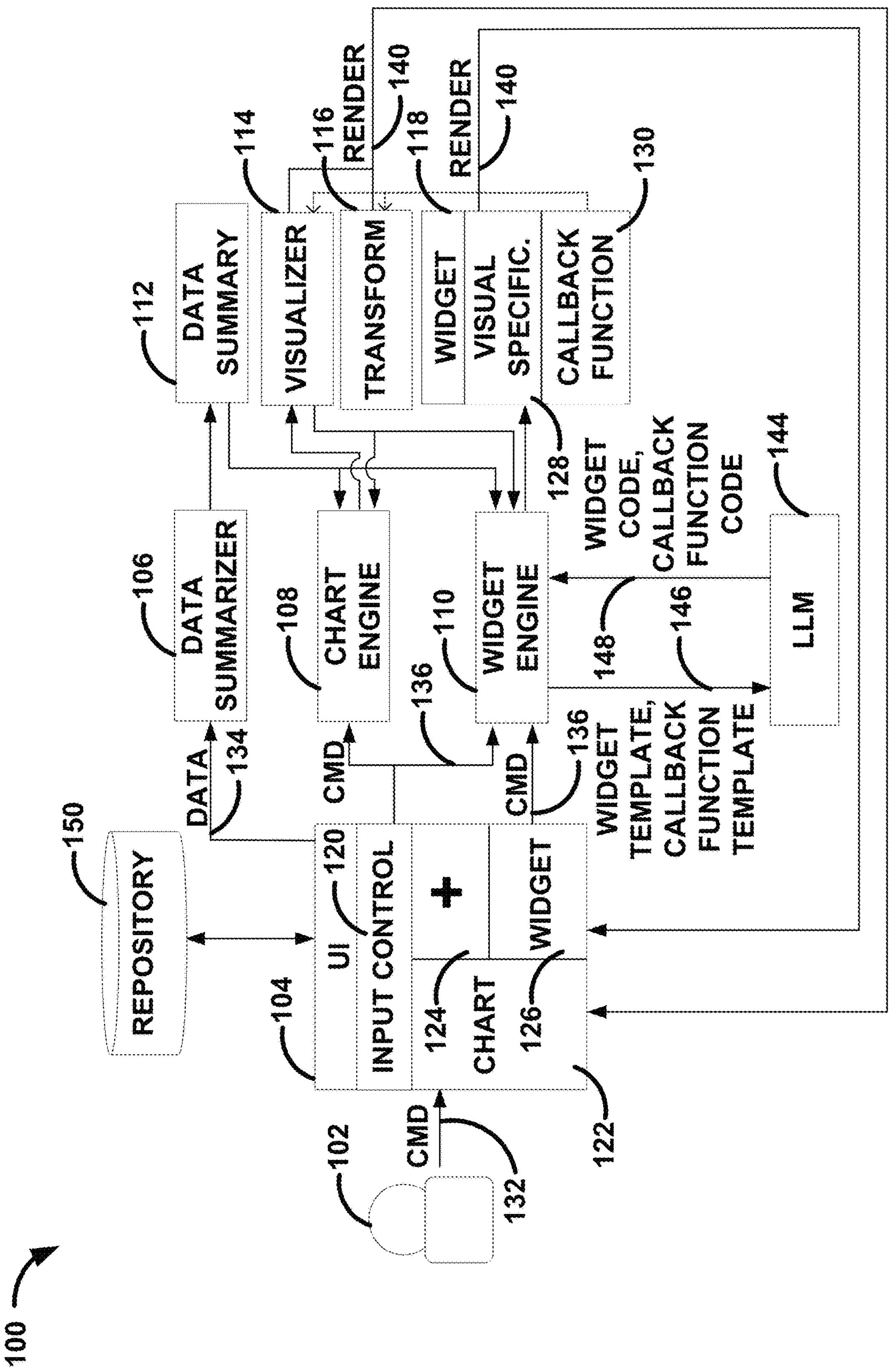
FIG. 1 illustrates, by way of example, a system for dynamically synthesized widgets.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present subject matter. The following description of example embodiments is, therefore, not to be taken in a limited sense, and the scope of the present invention is defined by the appended claims.

An emerging approach to address a graphic visualization editing and refinement challenge is to design natural language interfaces (NLIs) that allow users to describe editing effects in natural language. Then, based on the instructions from the user, the tools automatically infer options and corresponding parameter values to apply the edits. For example, the user can give the natural language command to "move the x-axis title to the start of the axis", which will translate to changing a "titleAnchor" property of an "x" encoding to a value of "start". However, while NLIs address the discovery and navigation challenges, they forgo the benefits of a graphical user interface (GUI). A GUI provides the abilities to perform fine-grained edits, obtain immediate visual feedback from editing results, and quickly undo and reapply edits. For example, if the user wants to make the width of strokes in a line chart thicker, they do not always have the exact size in mind, and will often try out different sizes before choosing one that best suits the chart. Or, if the user wants to change the colors of the bar chart, they may not know the exact hex (or RGB) value to provide. Such limitations restrict applications of NLIs in visualization editing.

To address the visualization editing and refinement challenge, a new interaction approach called interaction via dynamically synthesized GUI widgets is provided. A tool for visualization editing is also provided. The tool allows the user to specify, in natural language, a widget that they would like to appear on a GUI. The natural language specification from the user can be provided, along with a curated prompt, to a large language model (LLM). The prompt can instruct the LLM to fill in a visual specification template (sometimes called a "widget template") and a callback function that instantiates the widget template on the GUI. The fill templates are called "widget code" and "template code", respectively.

The dynamically synthesized GUI widgets blend NLIs with interactive GUI widgets, so that users can benefit from benefits of both the NLIs and the GUI widgets. Users benefit from a reduction in the gulf of execution provided by NLIs and the interactivity provided by GUIs. To perform a visualization editing task using the dynamically synthesized GUI widgets, the user starts by either describing what edits they want to perform (e.g., "rotate x-axis label 45 degrees") or directly asking for a GUI widget that the user envisions to perform edits with (e.g., "give me a slider for me to control x-axis label angles"). Either way, the tool synthesizes a GUI widget (along with a preset value from a specification in the former case) using an LLM. The widget can then help the user to explore and perform subsequent edits.

Besides the immediate benefits of reduced navigation overhead and interactivity for exploring edit effects, users can also easily compose and coordinate multiple edits using dynamic widgets. The widgets can persist on the GUI after synthesis. The widgets can be used for quick editing access.

A widget synthesis engine of the tool can be powered by a LLM. The LLM can translate user inputs into a visual specification of the widget. The LLM can translate user inputs into a call back function that connects the widget inputs to visualization properties. The tool is highly expressive and supports both chart design edits (e.g., adjust tick spacing, legend position, color scheme, label and title font properties, among others) for authors to refine visualizations, and data-related edits (e.g., generating filters, zooming controllers, and sort) for readers to interactively explore visualizations without pre-built interactive widgets. A study with 24 participants was conducted and participants of the study prefer to use the tool over NLI only interfaces due to ease of repeating edits and increased confidence when editing using a GUI due to immediate visual feedback.

The tool provides a new interactive approach for visualization editing, dynamic widgets, that combines NLI with GUI widgets to reduce the gulf of execution and enhance interactivity. The tool provides a widget synthesis engine that leverages an LLM to translate natural language inputs into widgets and control functions. A user study was conducted to evaluate how users use the tool to solve visualization editing tasks.

FIG. 1 illustrates, by way of example, a system 100 for dynamically synthesized widgets. The system 100 as illustrated includes a user interface (UI) 104 communicatively coupled to a data summarizer 106, a chart engine 108, and a widget engine 110. The chart engine 108 is communicatively coupled to the widget engine 110. The system 100 further includes a large language model 144 accessible by the widget engine 110. The system 100 further includes a visualizer 114 and a transformer 116 communicatively coupled to the chart engine 108 and the widget engine 110.

A user 102 interacts with the UI 104, such as by using an input device and an output device of a computer. The user 102 can interact with the UI 104 to gain functionality of dynamically synthesized visualization editing widgets. The UI 104 includes a view of a chart 122. The chart 122 has one or more axes corresponding to one or more respective variables. The chart 122 provides a graphic view of data. Examples of types of charts include bar graphs, scatter plots, line graphs, pie charts, among many others.

The UI 104 includes an input control 120, through which the user 102 can indicate, using natural language, a widget 126 they want to use to edit the chart 122 and a corresponding initial edit of the chart 122. The items of the chart 122 that can be edited are varied and depend on the chart 122 presented. Examples of items that can be edited include font, axis labels, legend, color, line type, data point representation, data presented on the chart, among many others. The user 102 can enter the natural language description of the widget and the edit into the input control 120. The UI 104, through the chart engine 108 and the widget engine 110 and responsive to the user 102 entering the natural language description, can provide the widget 126 and a corresponding updated view of the chart 122 that reflects the edit indicated by the user 102.

The UI 104 further includes a widget generator control 124. The widget generator control 124 allows the user 102 to indicate a widget to be generated using natural language. The widget generator control 124 is similar to the input control 120, the widget generator control 124 providing the user 102 an ability to just generate the widget 126 without editing the chart 122 concurrently with the generation of the widget 126. The input control 120 generates the widget 126 and provides a concurrent edit to the chart 122.

The user 102 issues a command 132 to the UI 104, such as through an input control 120 or the widget control 124. The input control 120 is a software control through which the user 102 can enter natural language text. The natural language text can be typed, pasted, converted from audio to text and entered into the input control 120 or the like.

Widgets are implemented independent of the user interface and provide functionality for data visualization, data management, displaying date and time, or the like. Controls are UI software controls that are dependent on the UI and do not have the same purpose as widgets. The purpose of controls is to provide information to the UI 104 that indicates the data, widget, or the like, that is to be presented on the chart 122. The controls do not directly affect the chart 122 itself. The widget 126 directly affects the chart itself.

The data summarizer 106 receives data 134 from the repository 150 and generates a data summary 112. To generate visualizations and synthesize dynamic widgets 126, the LLM 144 can benefit from an accurate context of the data 134 the user 102 represented on the chart 122. However, due to a limited context window supported by LLMs 144, one cannot pass all of the data 134 to the LLM 144. The data summary 112 thus provides the LLM 144 with context about the data 134. An example of the data summarizer 106 produces a dense yet compact summary for any given dataset that is useful as a grounding context for visualization tasks. For every LLM query, the data summary 112 is provided in lieu of the data 134. First, the data summarizer 106 generates a base summary that applies rules to extract dataset properties including atomic types (e.g., integer, string, Boolean), general statistics (min, max, unique values etc.), and a random list of n data samples. Then the base summary is enriched by an LLM 144 to include a semantic description of the dataset (e.g., a dataset of stock prices for top 5 tech companies for 10 years), and fields (e.g., stock price in United States Dollars (USD)) as well as field semantic type prediction.

The chart engine 108 receives a command 136 from the UI 104 that indicates a change to be made to the chart 122 concurrent with generation of the widget 126. The user 102 can subsequently interact with the with widget 126 to adjust the edit that was concurrently made to the chart 122. The chart engine 108 interacts with the visualizer 114 to provide a rendering 140 of the chart 122 after the change. The chart engine 108 interacts with the widget engine 110 to generate a widget 118. Note the widget 126 is a visual instantiation of the widget 118. The chart engine 108 is primarily responsible for synthesizing visualizations-either new visualizations or to edit existing visualization based on the natural language prompt from the user 102. The chart engine 108 uses the enriched data summary 112 from the data summarizer 106, the user prompt (entered through the input control 120), and optionally visualization specification provided by the visualizer 114 to return a new visualization specification using the LLM 144. To ensure that the LLM 144 produces a valid visualization specification, and to prevent version based errors, the LLM 144 can be instructed to only use the schema implemented by the visualizer 114 to produce a valid output 140 in a markdown code-block format with language descriptors. Since chat based models like GPT 3.5 are trained to produce verbose output, using markdown code-block format ensures one can reliably extract the code block. To maintain consistency of output, one can provide some few-shot learning examples of the visualization specification with its description to the LLM 144.

The widget engine 110 is primarily responsible for synthesizing dynamic widgets 118. The widget engine 110 uses the data summary 112, current chart visualization specification, and the user prompt to return the widget 118. The widget 118 includes two components a visualization specification 128 (e.g., a hypertext markup language (HTML) or other visual specification) script and a callback function 130 (e.g., a JavaScript or other type of script that calls the visualization specification 128).

To ensure that the LLM 144 produces a valid visualization specification 128 and callback function 130 for the widget 118, one can provide strict templates 146 for the visualization specification and callback function 130. The templates 146 are provided to the LLM 144, along with the data summary 112, and the visualization specification. The visualization specification template defines the empty <div> stub with commented instructions. The callback function template has an empty function stub with a predefined return value. The templates improves the reliability and predictability of the code generated. Templates can also help to verify the code in further program analysis. Few shot examples of the visualization specification template being filled in and the callback function being filled in can be provided to the LLM 144 to improve accuracy of the filled in visualization specification template and the callback function template.

The LLM 144 is a type of artificial intelligence (AI) and massively large datasets to understand, summarize, generate, and predict new content. The LLM 144 is a generative LLM. The LLM 144 generates text-based content. The LLM 144 can be one of a variety of LLMs. Example, currently popular LLMs include ChatGPT 4 and ChatGPT 3.5-turbo. ChatGPT 4 has longer latency but is more accurate and tolerates errors in the natural language description than ChatGPT3.5-turbo. The ChatGPT 3.5-turbo LLM has less latency than ChatGPT 4 but is less accurate and requires the user 102 to be more specific and be more knowledgeable of the lexicon of the problem space than what is required by ChatGPT 4.

The visualizer 114 renders visualizations, such as the chart 122, the widget 126, or the like. The transformer 116 transforms data or a visualization. The transformer 116 can be an integral part of the visualizer 114 or a separate component. The visualizer 114 describes visualizations as encoding mappings from data to properties of graphical marks (e.g., points or bars). The visualizer 114 follows carefully designed rules to determine values for properties of the chart 122. Example properties include data point values, a visual depiction of each data point or bar, axes, legends, scales, or the like.

The transformer 116 supports transformations to the data and visual transformations. Example transformations to the data include aggregations, binning, filtering, sorting, and the like. Example visual transformations include stacking, faceting, and the like. An example software application that includes the visualizer 114 and the transformer 116 is Vega or Vega-Lite from the University of Washington Interactive Data Lab (UW IDL).

Figure 4:
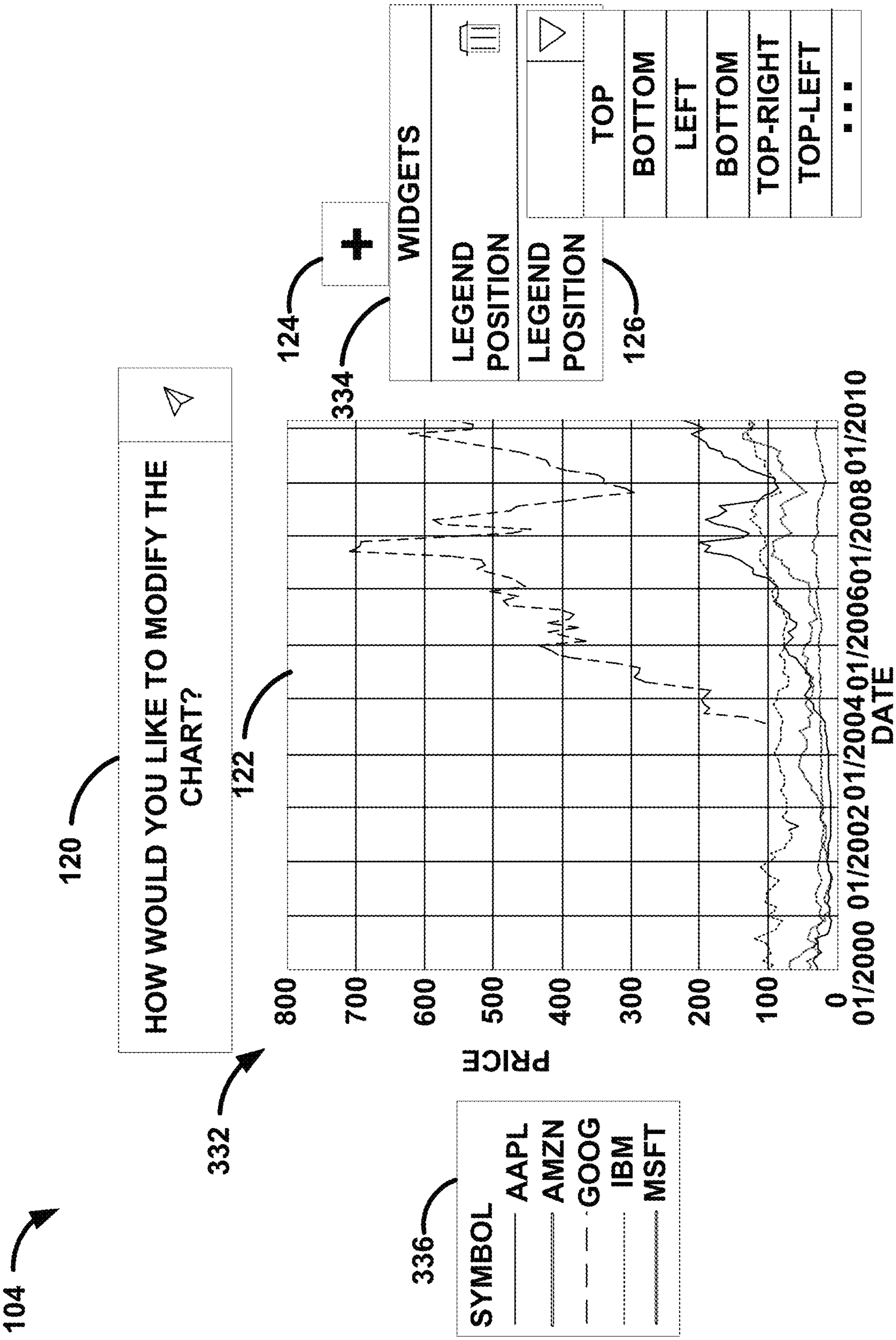
FIG. 4 illustrates, by way of example, a state of the UI after the widget to move the legend is generated and, concurrently, the legend is moved per the command issued.

The widget 118 as illustrated includes a visualization specification 128 that defines how the widget will be displayed on the UI 104. The widget 118 as illustrated further includes a callback function 130 that calls the visualization specification 128. The widget 118 is a modular sub-component. The widget 118 is dynamically generated by the engine 110 (in collaboration with the LLM 144). The widget 118 is a UI component that focuses on one or more particular edits or interaction tasks. The edit can involve simple changes to one or multiple chart properties, such as changing the position of the legend or slicing, or can involve a data transformation operation executed on the data before chart rendering, such as filtering specific ranges on the axes. At a high-level, a widget has two components:

The visualization specification 128 is a script that describes the UI elements of the widget 126 which the user 102 can interact with to manipulate the visualization of the chart 122. In the example of FIG. 4, the visualization specification 128 can include a script containing an <input> element of type slider to change the x-axis label size of the chart.

The callback function 130 contains the code that will be executed to manipulate the visualization and/or data whenever the user 102 interacts with the widget. This callback function 130 is of the form callback (event, chart)=>(transforms, chart), which accepts both the visualization specification and the current chart as inputs and generates an optional list of transforms and the updated chart as outputs. This callback function 130 can be attached to event handlers of all the input elements in the visual specification 128.

Figure 2:
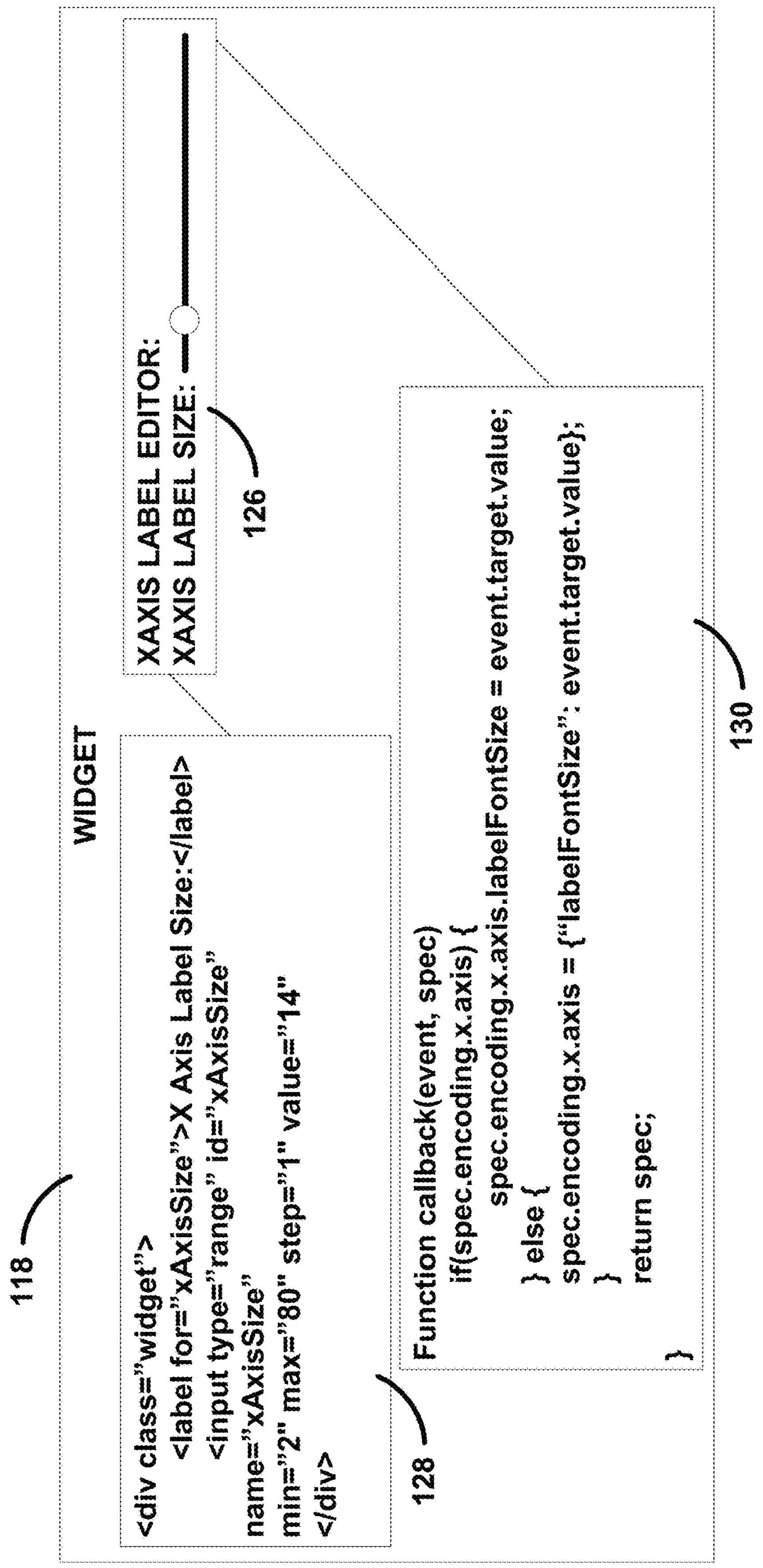
FIG. 2 illustrates, by way of example, an example of the widget including the visual specification and the callback function.

FIG. 2 illustrates, by way of example, an example of the widget 118 including the visual specification 128 and the callback function 130. The visual specification 128, in the example of FIG. 2, is written in HTML. The callback function 130, in the example of FIG. 2, is written in JavaScript. The widget 126, in the example of FIG. 2, is a slider that alters a font size of a label on an x-axis of the chart 122.

Returning to FIG. 1, the system 100 can help ensure the modularity of the widgets 126 so that edits from two different widgets do not conflict or manipulate the chart 122 in unexpected ways. This requirement has implications on how charts 122 and transforms are handled:

To ensure that each widget 126 only changes a small component of the chart 122, using a declarative chart representation is preferable to an imperative one. One such declarative representation is to use an object (e.g., a JSON object called as a specification) to encode the properties of the chart 122. For example, with JSON representation, to change the x-axis title, one can just edit the chart specification as spec.encoding.x.title="axis title" without having to change anything else regarding the chart.

Data transformations are an important part of visualization editing. The transformer 116 handles the data transformations, e.g., filter, fold, flatten, etc. The transforms can be represented as a list of objects. Each widget's callback function 130 can output a list of transforms. The transforms can be performed, by the transformer 116 in the order in which they are specified in this list. If there are multiple widgets 126 with transforms, one execute transforms in chronological order of selecting the widgets 126. To enable this, one can keep a mapping of the widgets 126 to their most recent callback function 130 output transforms, so that all of the latest transforms in are in order before rendering the chart 122. For every widget 126 that adds transformations to the chart 122, a switch control can be added so that a user can enable or disable the transform. Consider an example in which a user requests a widget to slice the date range. The widget 126 they are provided adds a filter transform on the data 134. The widget engine 110 identifies this as a special transform widget, and allows the user to dynamically enable or disable the transform (e.g., using a checkbox control or the like) to see the chart 122 before or after the transform, by simply selecting or de-selecting the transform.

Dynamic widget synthesis can be split into three stages: pre-processing, LLM based synthesis, and post-processing. The data summarizer 106, chart engine 108, and the widget engine 110 are used for each of the respective stages.

Before sending any edit or widget synthesis queries to the LLM 144, the UI 104 can split the data from the visualization specification, and any other unnecessary chart properties (like configuration properties like width, height etc.) to prevent context overflow. This also ensures that the rendering engine (the visualizer 114) can remain responsive to UI changes. The data summarizer 106 then performs data pre-processing to generate the data summary 112.

LLM based synthesis includes generating a prompt for the LLM 144 to fill in the templates 146 and generate the code 148. The prompt can include the data summary 112, the query from the user 102 that is input through the input control 120 or the widget control 124, few shot examples, or the like. The prompt can be engineered to make the LLM 144 provide accurate code 148 that will execute and render the natural language description that is desired by the user 102.

The code 148 can be parsed to check for formatting errors, and then compiled to check for syntax or schema errors in the synthesized visualization specification 128 (sometimes called "widget code") or callback function code 130. In case of errors, an error message can be issued and the LLM 144 can be prompted to fix the errors in the same conversation context. If this does not work to fix the errors, the prompt can be tried again.

To prevent errors, and ensure the validity of the widgets, the widget engine 110 can perform a series of post-processing steps on the code 148 synthesized by the LLM 144, such as by using program analysis. Some of possible steps involved in the post-processing stage are provided below. Each step can be achieved by parsing the code 148 to an abstract syntax tree (AST) and manipulating the AST.

The visualization code can be parsed, by the widget engine 110, to ensure there are no conflicts in the "ID" property between the synthesized widgets and previous widgets. If there is a conflict, the ID property can be programmatically modified to be unique and the corresponding callback function code can be modified consistent with the new, unique property ID. The synthesized callback function can be parsed and analyzed to ensure it has the right function name and valid function parameters. The widget engine 110 can ensure that the properties of the chart being edited are either already present in the current chart or the callback function handles the null case correctly.

The UI 104 can be implemented as a web application. A library, such as the react-html-parser library, can be used to attach and detach widgets 126 to the UI 104 on the fly as they are created and deleted. A backend coupled to the UI 104 can host the data summarizer 106. The data summarizer 106 can be implemented as a flask web server that communicates with the front-end UI 104 using an application programming interface (API), such as representational state transfer (REST) API. Another API can issue queries to the LLM 144.

A use case is now presented with reference to some FIGS. to provide context regarding implementation and use of at least portions of the system 100. In this use case, Alice is a consultant analyzing stock trends of technology companies using spreadsheets, and she needs to create visualizations to present her analysis results to her collaborator.

Figure 3:
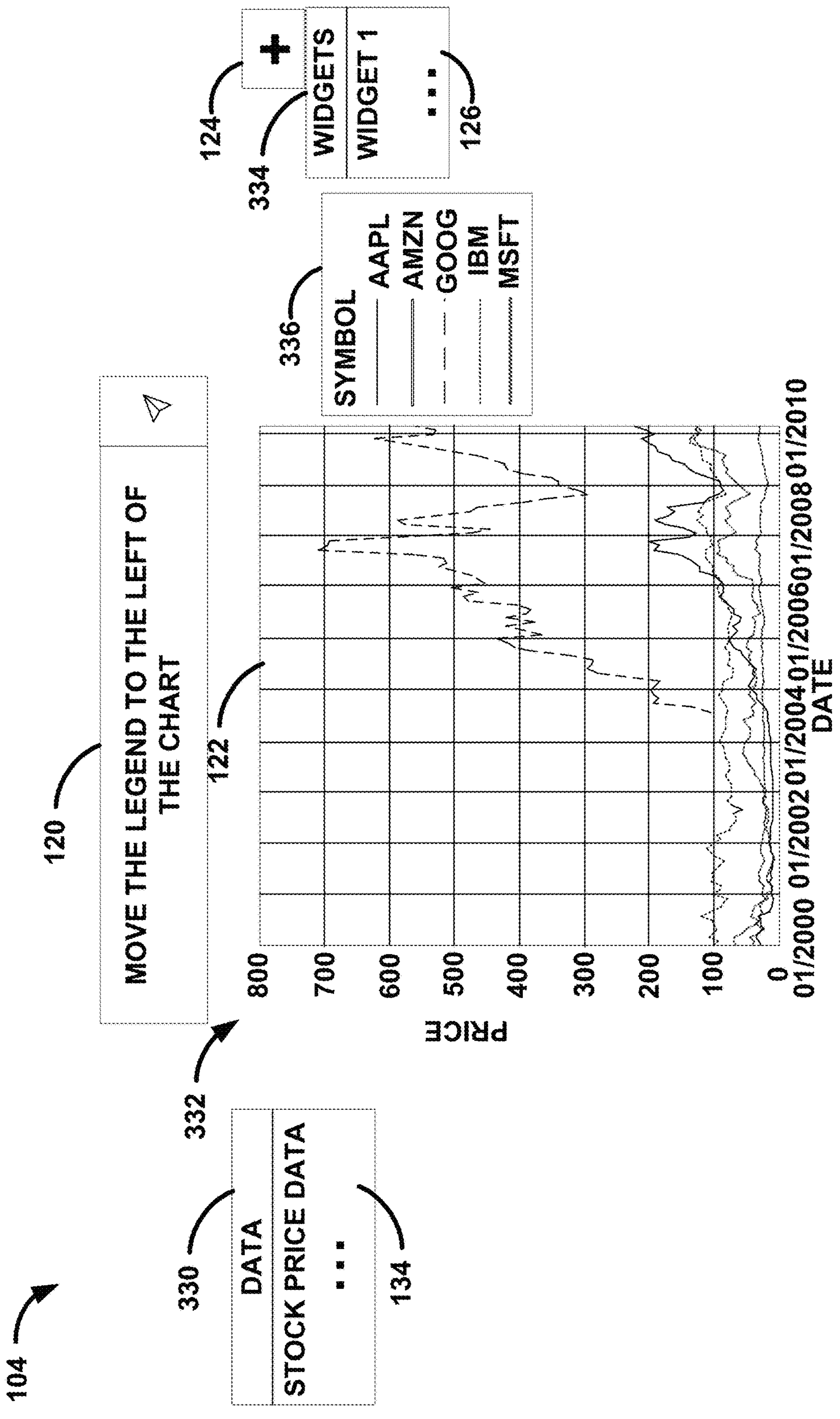
FIG. 3 illustrates, by way of example, a view of the UI.

FIG. 3 illustrates, by way of example, a view of the UI 104. The UI 104 includes four components: (a) a data panel 330, (b) the input control 120 for specifying visualization and editing commands, (c) the visualization panel 332 that shows the current working chart 122, and (d) a synthesized dynamic widgets panel 334 that users can use to manage widgets 126 and edit the working chart 122.

Alice generates the chart 122 by importing the data (e.g., "stocks.csv") from a repository 150, and the data 134 shows up in the data panel 330. To create the chart 122, she provides a natural language (NL) description in the input control 120 and enters the description. An example of such a description is "create a line chart showing the stock trends". Upon submission, the chart engine 108 invokes the LLM 144 to generate a line chart based on a data summary 112 and the NL description provided in the input control 120. Along with creating the chart using NL, Alice can also import other visualization specifications, such as those created from other tools.

Alice is not quite satisfied with the initial visualization because (1) the legend takes too much space on the right, (2) x-axis labels are too small to read, and (3) the line scheme is not ideal, Alice decides to use dynamically synthesized widgets to refine the chart. With dynamically synthesized widgets, Alice has two options to edit charts: (1) provide a natural language instruction in the input control 120 to describe the edit she wants to achieve, and (2) explicitly add a widget by clicking the widget control 124 at of the widgets panel 334 and providing a natural language description of the desired widget. Either way, Alice can dynamically generate widgets and interact with the widgets to perform edits.

Alice first wants to adjust a position of a legend 336 to keep the legend 336 contained within the main chart 122 canvas. She decides to use chart editing commands to describe changes she wants to apply. For this, she provides the instruction "move the legend to the left of the chart" through the instruction control 120. Based on the instruction, the system 100 updates the visualization specification of the chart 122 to re-position the legend 336. Additionally, the widget engine 110 also automatically generates a widget 126 with a drop-down menu for various legend positions pre-populated.

FIG. 4 illustrates, by way of example, a state of the UI 104 after the widget 126 to move the legend 336 is generated and, concurrently, the legend 336 is moved per the command issued. Note the data panel 330 is no longer illustrated, but may still be shown on the UI 104. Alice experiments with multiple legend positions before finalizing her final choice of "top-left", which is in fact a better option than "left" that Alice didn't expect in the beginning.

Figure 5:
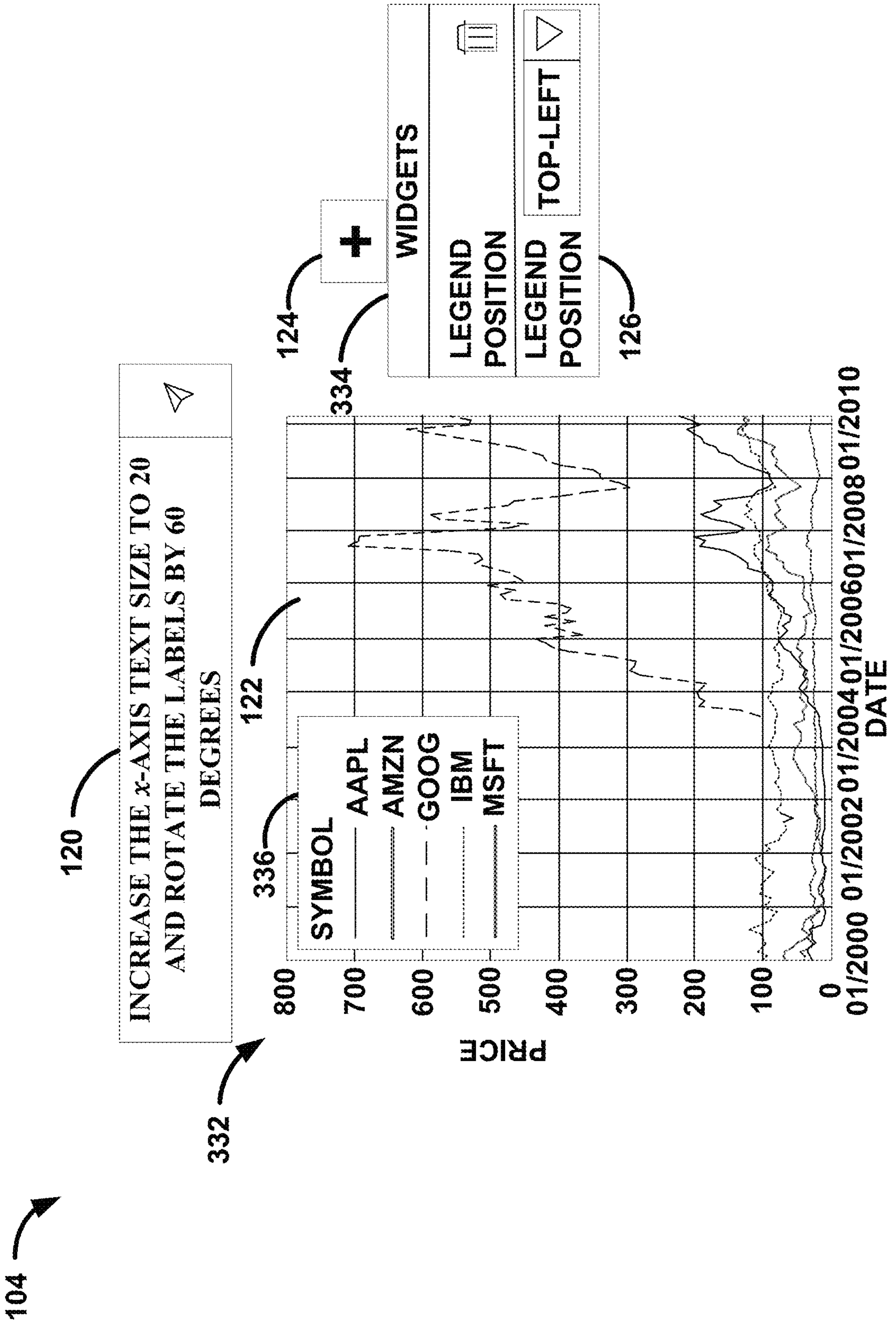
FIG. 5 illustrates, by way of example, a state of the UI after the legend is moved to the top-left of the chart.

FIG. 5 illustrates, by way of example, a state of the UI 104 after the legend 336 is moved to the top-left of the chart 122. Next, Alice wants to resolve issues with x-axis labels which are currently too small. However, this can be a quite challenging edit: increasing font-size would most likely make labels overlap with each other; and while overlaps can be resolved by rotating label angles, too much rotation would make them less readable. Thus, Alice coordinates the edits to label font size and rotation angle to find the right balance. Alice doesn't have a clear idea on the optimal combination yet, so she starts with an exploratory command "increase the x-axis text size to 20 and rotate the labels by 60 degrees". The system 100 updates the chart 122 based on the command and presents her with a "x-axis Label Editor" widget 126B that lets her edit the text size and angles of the x-axis labels simultaneously.

Figure 6:
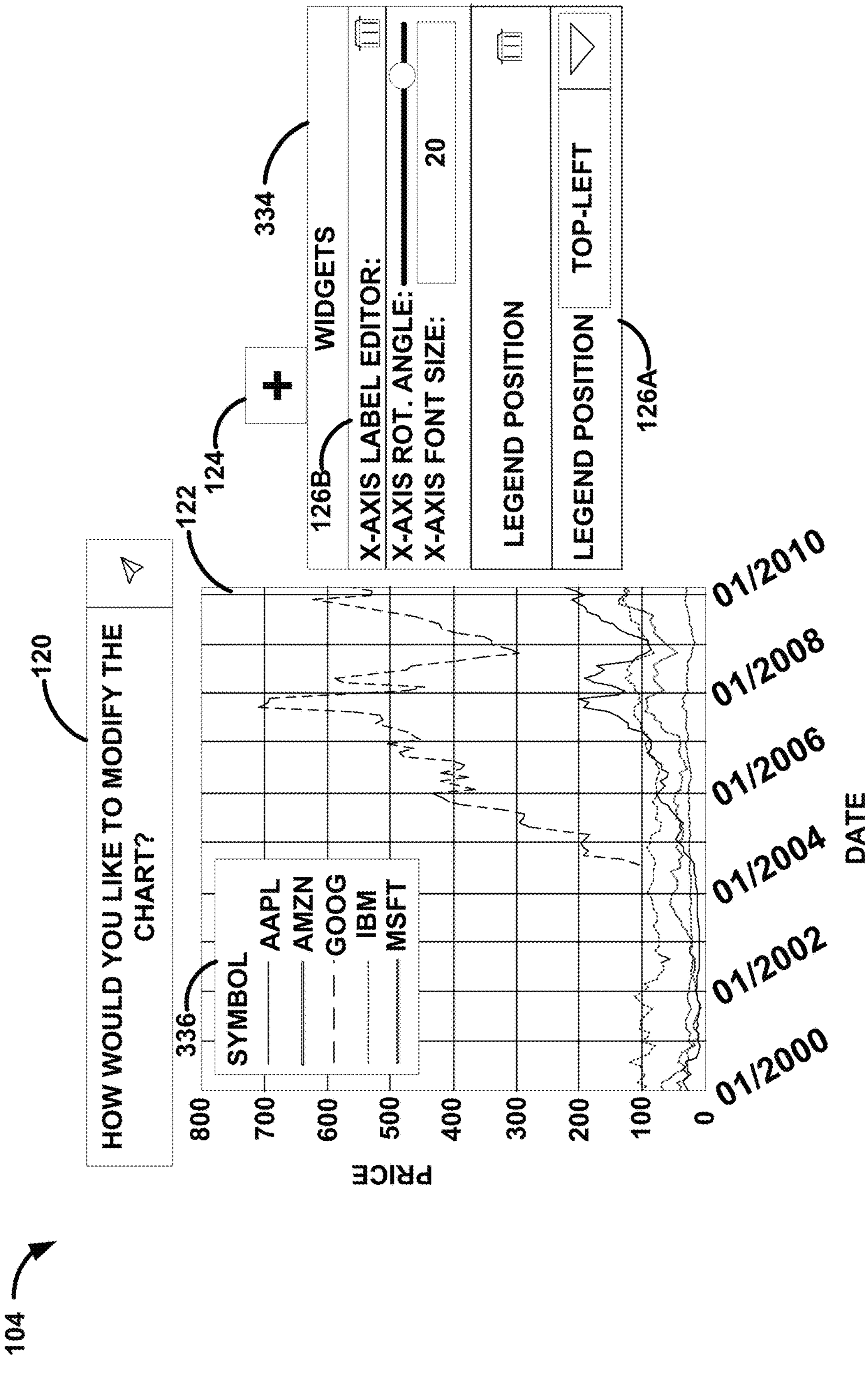
FIG. 6 illustrates, by way of example, a state of the UI after the x-axis labels are sized and oriented in accord with the command provided through the input control.

FIG. 6 illustrates, by way of example, a state of the UI 104 after the x-axis labels are sized and oriented in accord with the command provided through the input control 120. With the widget 126B, Alice can try out many combinations with ease without having to re-issue the editing instruction. After some trial and error, she settles on a font size of 15 and rotation angle of −45 that suit her needs.

Figure 7:
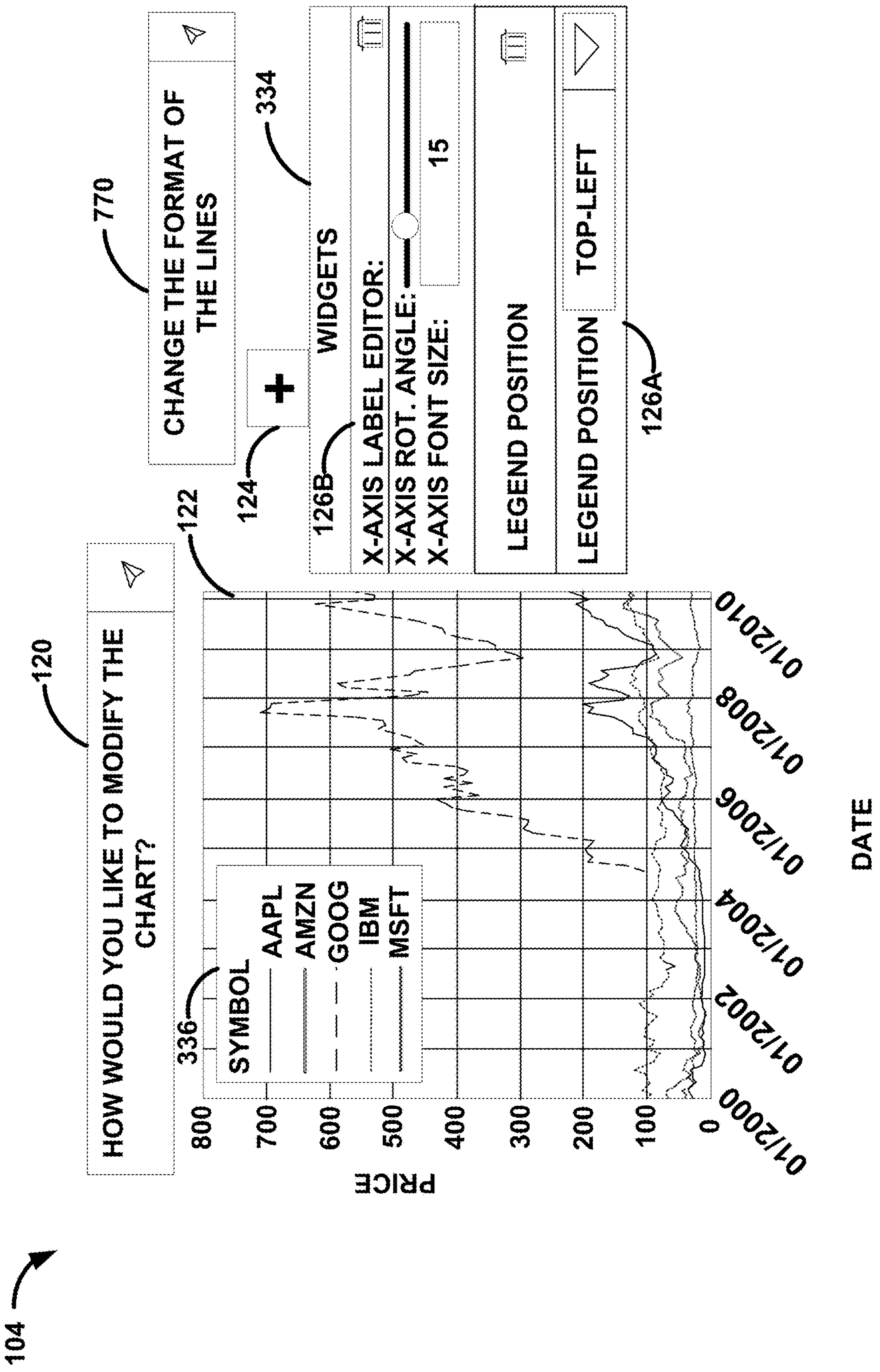
FIG. 7 illustrates, by way of example, a state of the UI after the x-axis labels are set.

FIG. 7 illustrates, by way of example, a state of the UI 104 after the x-axis labels are set. Alice could use the NL input control 120 to change the colors of the chart 122 or a configuration of a line (e.g., dots, dashes, compound, thickness, etc.). If Alice wanted to modify the default color palette of the chart, but did not have concrete colors in mind, she could use the widget control 124 to request a widget to explore the color options. To do so, she selects the widget control 124 to open a widget creation command box, in which she can type in the prompt "change the color of each stock symbol". The widget engine 110, which understands the current context of the chart 122 and the current data 134, generates a tailored "Stock color picker" widget that allows her to pick colors for each stock symbol in the chart 122.

The widget engine 110 and/or chart engine 108 even knows all the symbols that are part of the current data 134, and is able to generate a tailored widget for her. Alice is able to try different colors, get instant visual feedback, and choose the desired colors for her chart.

Figure 8:
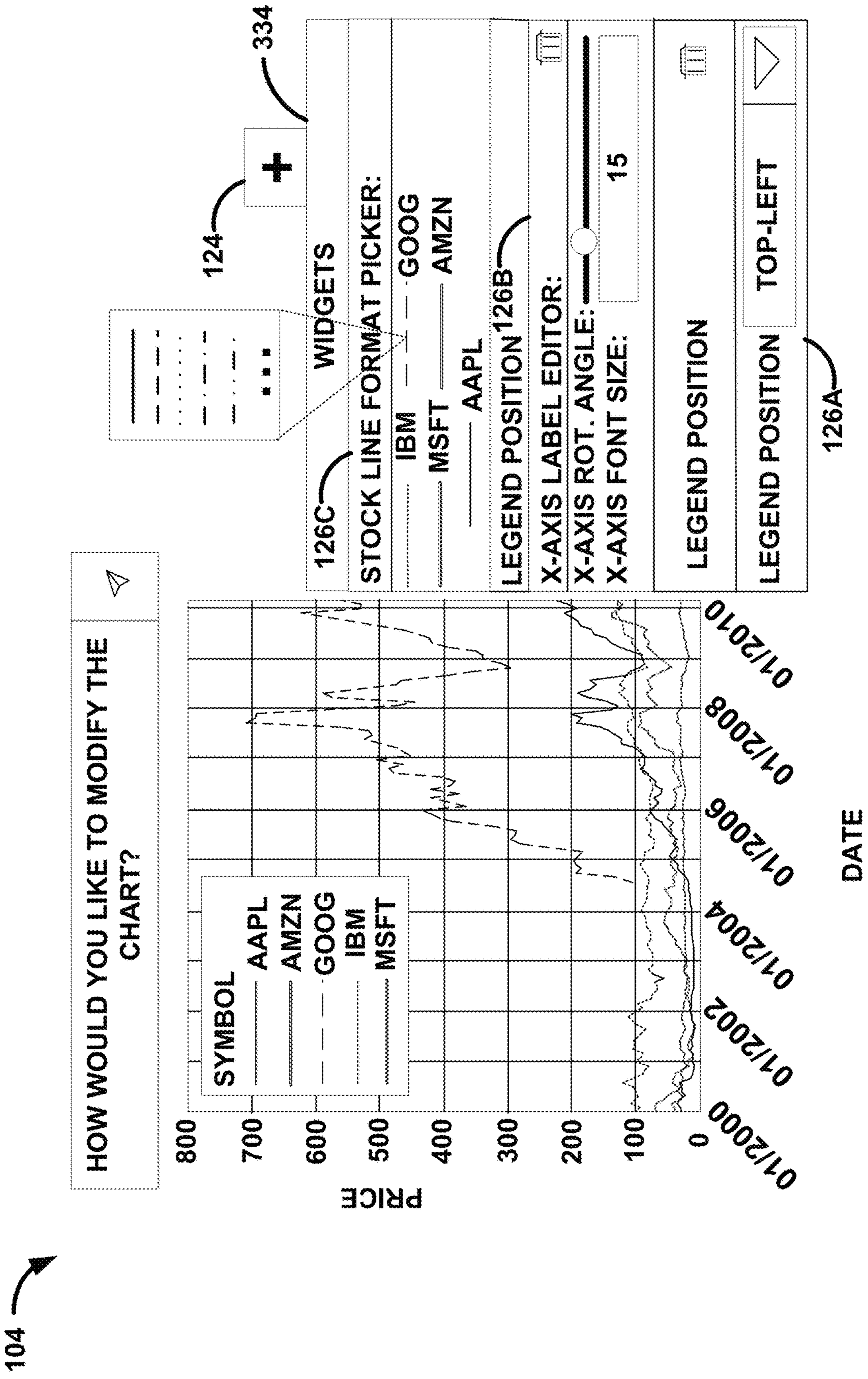
FIG. 8 illustrates, by way of example, a state of the UI after Alice has entered a command to generate a widget that can be used to change the format of the lines on the chart.

FIG. 8 illustrates, by way of example, a state of the UI 104 after Alice has entered a command to generate a widget 126C that can be used to change the format of the lines on the chart 122. The command was entered into an input control 770 that is displayed responsive to the user 102 selecting the widget control 124. The widget engine 110, responsive to the command from the input control 770, generates a line format picker widget 126C. Alice can select the format of each line of the chart 122 using the widget 126C.

After Alice finishes up the customization, she emails the visualization to her collaborator Alex who plans to include the visualization in a news article he is writing. After some analysis, Alex wants to compare the stock trends for just MSFT and IBM to get deeper insights. Instead of going back and asking Alice to do that, Alex imports the visualization spec in the system 100 to perform the edits (e.g., a specification that contains data as elaborated more elsewhere). After importing, Alex provides the command "compare only MSFT and IBM", and the system 100 quickly updates the chart to run a filter transformation to show only the data for MSFT and IBM. The system 100 also provides a "Symbol Filter" widget with a checkbox for each stock symbol, using which Alex can continue to compare different stock trends choosing one or more symbols to compare. The system 100 also intelligently identifies that this widget has a data-filtering transform and provides a switcher for users to enable or disable the transformation. Next, Alex asks for a date slicer widget to zoom the visualization by using a smaller time window. Since the stock prices of the two companies that are compared are much lower than other companies, Alex also requests a widget to slice the y-axis range. Now using the generated y-axis range slicer, Alex can zoom in and out of range window to see minute price changes within the time window of his choosing.

Figure 9:
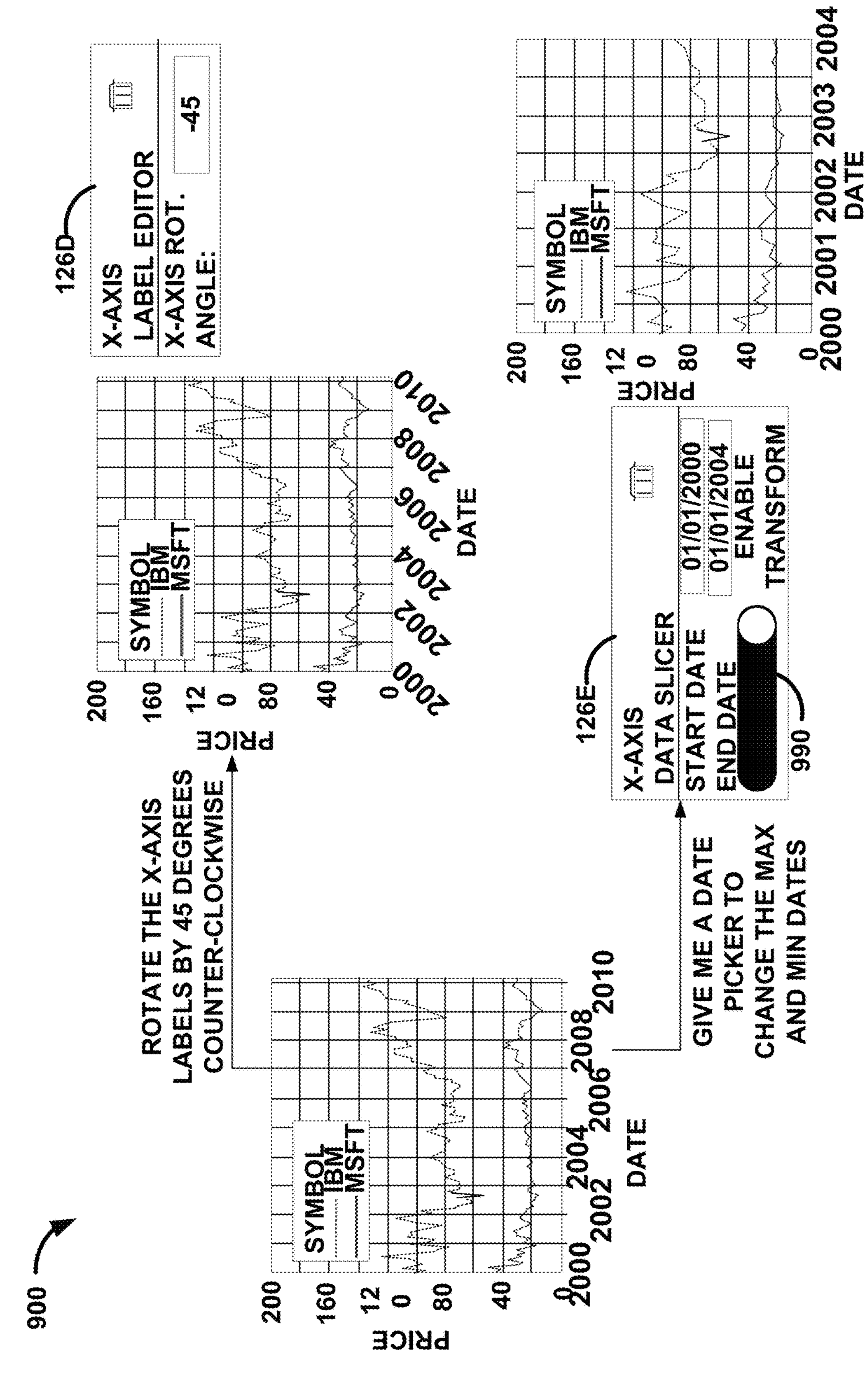
FIG. 9 illustrates, by way of example a series of states of the UI as Alex interacts with the UI.

FIG. 9 illustrates, by way of example a series of states of the UI 104 as Alex interacts with the UI 104. The state in FIG. 9 is after data filtering and y-axis range adjustment. Alex now desires to adjust the x-axis labels to be more readable. Alex enters "rotate the x-axis labels by 45 degrees clockwise" into the input control 120. A corresponding widget 126D is generated so that Alex can adjust the angle without having to enter another command. Instead, Alex can interact with the widget 126D to adjust the rotation angle. Then Alex decides he wants to focus the article on the stock prices between 2000 and 2004 so he selects the widget control 124 and enters "give me a date picker to change the max and min dates" into the input control 770. Alex limits, using the widget 126E, the min and max between these dates and enables the transform using the enable control 990 that accompanies the data transform. After finding the desired visualization, Alex includes the final visualization in his article for publication. Alice and Alex are able to complete the visualization refinement and exploration tasks with ease thanks to the following benefits of the system 100:

In conventional GUI, Alice needs to navigate menus and panels to locate widgets to perform edits, which requires proficiency in both UI and visualization terminologies. The system 100 lowers this barrier by allowing Alice to obtain desired widgets via NL descriptions.

Dynamically synthesized widgets allow Alice to perform fine-grained edits and obtain immediate visual feedback from editing results, which enables her to explore and coordinate editing options. This allows her to find desired edits through trial-and-error for edits she previously doesn't know precisely (e.g., color, rotation angle and text).

Alice is not able to explore edit options easily with a NL interface as the NL interface requires her to describe concrete parameter values and has a delayed specification-feedback cycle.

The system 100 is highly expressive and supports both chart refinement edits for the author Alice and data manipulation edits for the reader Alex. Without the system, Alex would either have to interact with Alice every time he wants an updated version of the chart, or ask Alice to create an interactive visualization which requires additional efforts to tailor options.

As dynamic widgets persist after creation and they are fully compositional, Alice and Alex can go back and repeat edits (e.g., update x-axis range as analysis objective changes) or revert certain edits (e.g., undo data filtering). This can be challenging with a NL interface as changes are non-compositional, and every update requires a new editing command. Or, with a conventional UI, they would need to keep track of all edits they have done in order to repeat or redo edits.

FIG. 10 illustrates, by way of example, a diagram of an embodiment of a method 1000 for dynamically synthesizing UI widgets. The method 1000 as illustrated includes receiving, by a user through a user interface (UI), data indicating a dataset of structured data, at operation 1010; displaying, by the UI, the data on a chart, at operation 1012; receiving, by the UI, a request from the user to alter a representation of the data on the chart, at operation 1014; dynamically synthesizing a widget operable to alter the representation of the data on the chart based on user interaction with the widget, at operation 1016; presenting, by the UI, the widget on the UI alongside the chart, at operation 1018; and altering, based on user interaction with the widget, the chart, at operation 1020.

The operation 1016 can include prompting a large language model (LLM) to fill in code of code templates resulting in templates with completed code. The templates with complete code can include visualization code that defines how the widget appears on the UI, and callback function code that calls a visualization specification of the chart and the visualization code. The request can be provided in natural language through a widget input control.

The request can be provided in natural language through an input control and the request further indicates a modification to the chart. The method 1000 can further include concurrently performing the modification to the chart along with presentation of the widget on the UI. The method 1000 can further include pre-processing the dataset resulting in a data summary. Prompting the LLM further includes providing the code templates along with the data summary to the LLM. Prompting the LLM can further include providing few shot examples along with the prompt.

To understand how users can use the system 100 or method 1000 to solve visualization editing tasks, a within-subjects lab study was conducted with 24 participants. In the study, users were asked to solve two sets of five visualization editing tasks, one set using the system 100 and another using a baseline NL interface-based tool. The following research questions were asked and answered:

RQ1 Does the system 100 or method 1000 reduce users' efforts to edit visualizations?

RQ2 In what scenarios do users prefer to use dynamic widgets comparing to a baseline tool?

RQ3 What are users' strategies to work with dynamic widgets?

24 participants (13 female, 10 male, 1 chose not to disclose) were recruited. Of the 24 participants, 2 worked with data visualization at-least once daily, 4 participants worked with visualizations weekly, 14 participants worked with visualizations at least once a month, 4 participants less frequently but still occasionally worked with data visualization. Participants mentioned they had prior experience with a variety of visualization tools and libraries including: matplotlib (Python), Seaborn (Python), ggplot®, Tableau, Excel, D3, and more. None of the participants had any experience with Vega-Lite or Vega libraries. Three of the 24 participants reported they performed data analysis daily, 6 participants did it weekly, 8 participants did it at least few times a month, and 7 participants did it less frequently but still occasionally. The following two conditions were considered in the user study. The NL-based visualization editing approach was chosen as the baseline.

Baseline Condition: the system 100 UI 104 was modified to include support for NL commands along with a set of pre-populated UI widgets for basic chart manipulation (e.g., chart title, axis range etc.) and the support for dynamic widgets was removed. By providing both NL and basic UI supports for users to freely choose from, this is a fair state-of-the art baseline tool for the study. Pre-populated widgets are similar to static UI users use to edit visualizations (like Excel® from Microsoft Corporation, Google Sheets from Google, LLC etc.). For the editing tasks, users can use a combination of natural language commands and the pre-populated widgets to edit the chart.

Experiment Condition: This is the system 100 with the support for dynamic widgets on top of the baseline condition. With the UI 104, the users can edit the chart using natural language commands, add custom dynamic widgets, or use the same set of pre-populated widgets. As an addition, whenever the user provides an NL edit command, a widget is synthesized and automatically added as a dynamic widget. The synthesized widgets are displayed in the reverse chronological order, so the widget synthesized most recent in time is shown at the top of the widget panel.

Note that a widget-only baseline, based on an existing visualization tool, was not used as it would require restricting participants to only people with experience with a certain visualization tool, and hence limiting diversity of the participants. However, user feedback was collected in the interview on their opinions on how their experiences with the system 100 differs from their favorite tools.

Three data visualization tasks were selected and derived from popular datasets. Since the focus is on visualization editing tasks, not the authoring task, the participant starts each task with a base dataset and a base visualization. The participants are asked to perform a series of edits to the visualization. Each task contains five sub-tasks containing instructions to perform edits to a base chart. Three topics of questions were asked: (1) editing the visualization with a concrete editing task, (2) exploratory editing task (e.g., try a few options and then pick the best stroke width), and (3)

editing tasks with a question to be answered based on the chart (e.g., zoom in to a time window or range, filter data etc.).

Task 1 (Stock Trends). Given a dataset of stock prices for the top five tech companies over a period of ten years and the base line chart visualizing the stock trend, the user is asked to complete the following sub-tasks:

Task 1 title change. (1) Change the chart title to "Stock Trend". (2) Try different lines stroke widths and find the best one that suits you. (3) Edit the chart to show the stock trends for AAPL and MSFT only. (4) Change the y-axis max range to 250 to get a zoomed in view. Then, answer the question: "By just viewing the chart, get the minimum and maximum stock price for both AAPL and MSFT". (5) Now compare only between IBM and MSFT. Then, answer the question: "By just viewing the chart, find the month and year, where the difference in stock price between the two companies were maximum."

Task 2 (Unemployment Data). Given a dataset of USA unemployment statistics over multiple sectors and the stacked area chart below visualizing the distribution of unemployment numbers, the user is asked to complete the following sub-tasks. (1) Change the x-axis title to "Timeline". (2) Try out different legend positions (inside and outside the chart) to choose the best position that suits you. (3) Edit the chart to show the trends for Construction and Agriculture sectors only. (4) Edit the y-axis max date to Jun. 1, 2004 (June 2004). Then, answer the question: "By just viewing the chart, get the approximate month and year where the difference in the unemployment rate between the two sectors were maximum". (5) Now compare only between Finance and Construction. Then, answer the question: "By just viewing the chart, get the approximate month and year where the difference in the unemployment rate between the two sectors were maximum".

Task 3 (Weather Data). Given a dataset of ten year Seattle weather and the stacked bar chart below visualizing the aggregated distribution of weather over each month, the user is asked to complete the following sub-tasks: (1) Change the y-axis title to "Number of Records". (2) Rotate the x-axis labels by 45, 65, and 90 degrees and choose the best one for you. (3) Change the color of each weather type to the following colors: Sun to Yellow, Snow to Gray, Rain to Blue, Fog to Green, Drizzle to Purple. (4) Edit the chart to only show "Snow" weather for all the months. Then, answer the question: "By just viewing the chart, find the month with the lowest snow days." (5) Edit the chart to only show "Fog" weather for all the months. Then, answer the question: "By just viewing the chart, find the months with the highest fog days."

To enable easy access to the system 100, both the control and the experiment versions of the tool were hosted online and could be accessed by participants via their web browser. After obtaining user consent, the audio and the screen-cast of each participant was recorded, and the users were encouraged to think aloud during the study. In each study session, the participant completed one of the three tasks using the control condition and another task with the experiment condition.

To mitigate learning effect, both the order of task assignment, and the order of tool assignment were counter-balanced across participants through random assignment. Therefore, for each unique combination of 3 tasks and 2 conditions, there are 8 participant data points. Before each task in a study session, the participant was given a tutorial of the assigned tool, and were allowed to explore using the tool for 5 minutes with a test dataset. Before starting each task, it was explained that the dataset and the base visualization and provided time for the participant to explore and understand the dataset. We set a time limit of 15 minutes for each task. After each task, the participant filled out a post-task survey to reflect on their experience using the tool. After finishing both the tasks, participants answered a final survey to directly compare the two conditions. At the end of each study session, a brief informal interview was conducted at the end of the study to get the subjective experience of the participant participating in the study and feedback for the tool.

Both quantitative and qualitative metrics were gained during the user study. The success/failure for each editing sub-task the participant had to perform was recorded. A sub-task is considered failed, if the participant is unable to finish the task despite multiple attempts with the system 100. They are allowed to retry as many times as they prefer. Through app telemetry, all the NL commands the user provided to the tool were recorded, and the interactions with the widgets in the tool. In the post-task survey the user filled after every task, we recorded self-reported NASA

TABLE 1

| Subjective Work Load Questions and Ratings Scale |
|---|
| Q1.1. It was easy to complete the tasks using the tool provided. (1-Strongly Disagree, 7-Strongly Agree) |
| Q1.2. The AI understood my intent and made the right edits. (1-Strongly Disagree, 7-Strongly Agree) |
| Q2.1. How mentally demanding was this task with this tool? (1-Very Low, 7-Very High) |
| Q2.2. How hurried or rushed were you during this task? (1-Very Low, 7-Very High) |
| Q2.3. How successful would you rate yourself in accomplishing this task? (1-Perfect, 7-Failure) |
| Q2.4. How hard did you have to work to accomplish your level of performance? (1-Very Low, 7-Very High) |
| Q2.5. How insecure, discouraged, irritated, stressed, and annoyed were you? (1-Very Low, 7-Very High |

After each task, participants rated (on a 7-point Likert scale) their experience (questions 1.1-1.2) and the subjective workload using NASA TLX measures (questions 2.1-2.5).

TABLE 2

| Questions and Ratings Scale |
|---|
| Q1.1. Which tool would you prefer to use? (1-UIDW (the system 100), 7-UINL (NL interface with no dynamic widgets)) |
| Q2.1. Which tool was more mentally demanding to communicate? (1-UIDW, 7-UINL) |
| Q2.3. Which tool made you feel successful in accomplishing the task (1-UIDW, 7-UINL) |
| Q2.4. For which tool did you work harder to accomplish your level of performance? (1-UIDW, 7-UINL) |
| Q2.5. With which tool made you feel more insecure, discouraged, irritated, stressed, and annoyed? (1-UIDW, 7-UINL) |

After finishing both the tasks, participants comparatively rated (or a 7-point Likert scale) their tool preference (question 1.1) and the subjective workload using NASA TLX (questions 2.1-2.5) comparing between the two conditions. (note: in the survey the names of the UI were coded to prevent bias)

In the post-study survey the user filled at the end of both the tasks, each self-reported preference and modified NASA Task Load Index that focused directly on comparing their experience between the two tools were determined (for survey questions look at Table 2). These themes are used to explain the qualitative results. A paired t-test was used to measure the statistical significance of quantitative metrics.

Participants using the UINL tool failed to complete sub-tasks more often then the participants using the UIDW tool. When using the UINL tool, seven participants (P4, P5, P6, P10, P11, P16, P17) failed one of the sub-tasks compared to two participants (P1, P20) when using the UIDW tool. None of the participants failed on more than one sub-task during the study. It is important to note, these failures are despite participants retrying the tasks as many times as they want.

Figure 11:
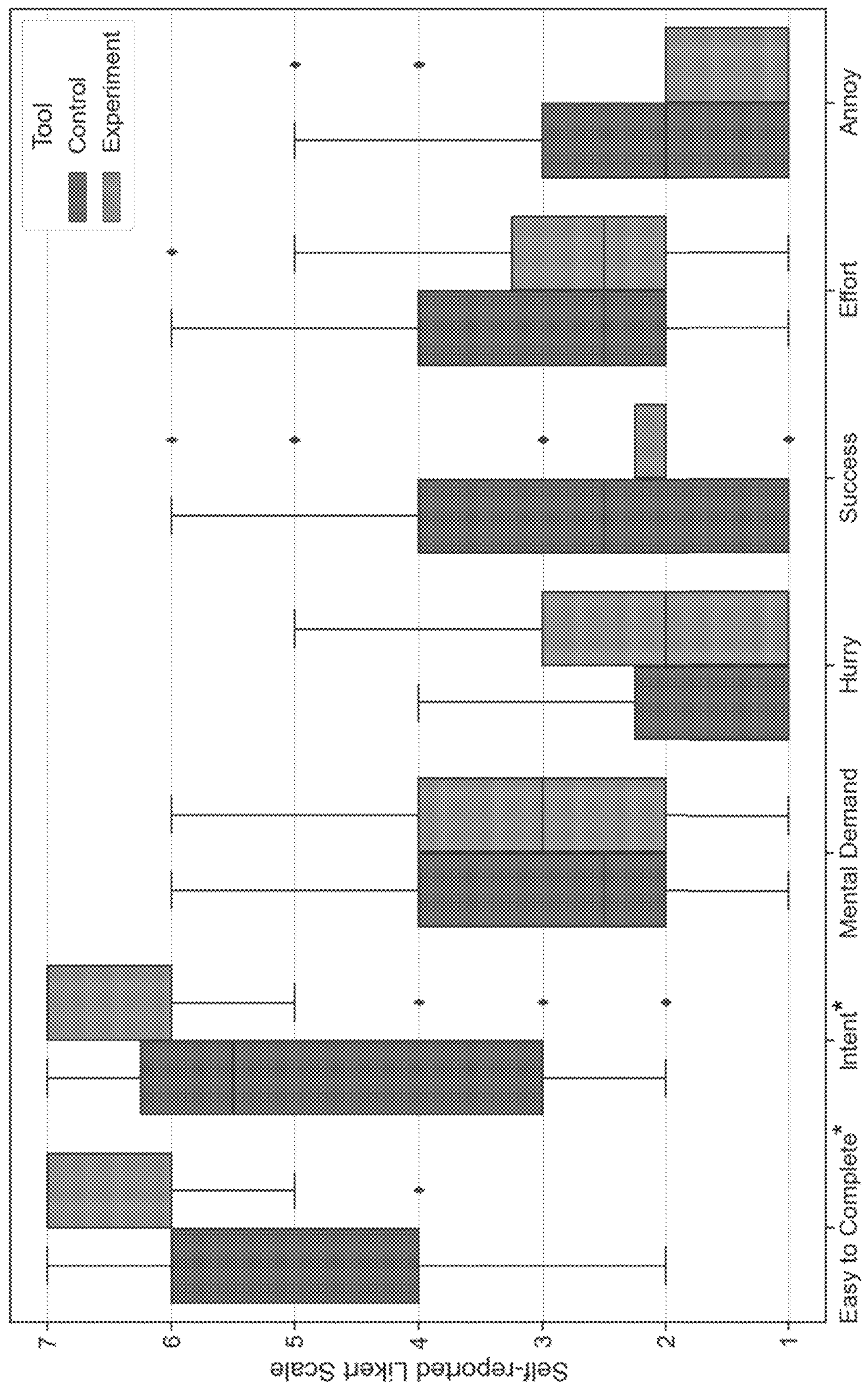
FIG. 11 illustrates, by way of example, a graph of the self-reported score (Likert scale; higher is better) for ease of completing the task with the tool provided for each condition.

FIG. 11 illustrates, by way of example, a graph of the self-reported score (Likert scale; higher is better) for ease of completing the task with the tool provided for each condition. Participants using UIDW found it significantly ($p=0.004$) easier to complete the task ($\mu=6.26$, $\sigma=0.86$) compared to using the UINL ($\mu=5.13$, ø=1.6).

The average time $\bar{t}$ for participants in the UINL to complete the task is 7 minutes and 22 seconds ($\bar{t}_{task\_1}$=6'05" (six minutes and five seconds), $\bar{t}_{task\_2}$=9'23", and $\bar{t}_{task\_3}$=6'37"). In the UIDW condition, participants took an average time of 6 minutes and 36 seconds $\bar{t}_{task\_1}$=6'20", $\bar{t}_{task\_2}$=7'07", and $\bar{t}_{task\_3}$=6'23") to complete the task. The difference in task completion time between the two conditions is not statistically significant. Note that the exploratory nature of some sub-tasks (e.g., task 1.3) encourages participants to spend time exploring the visualization, and the completion speed is not a definitive measure of performance. The completion time is reported here as a setup for understanding user efforts that will be discussed in qualitative analysis.

The session recordings were analyzed to identify the root cause of these task failures. Six of the seven failures in the UINL condition and both the failures in the UIDW condition happened in Task 2.4, where the participants had to slice the date range for the chart. This was due to the model returning the dates in an incorrect format. When generating the widget, the model made this mistake fewer times compared to editing the chart specification directly.

The remaining one failure in the UINL condition occurred during the Task 1.5, where the participant had to change the filtering values from [MSFT, AAPL] to [MSFT, IBM]. In this instance, the model added an extra conflicting filter transformation instead of editing the existing transformation.

In the post-task self-reported NASA TLX ratings where participants scored their cognitive load performing the tasks in both the conditions (check Table 1 for questions), there was no statistically significant difference in the mental demand, how hurried or frustrated they felt, the effort required to complete the tasks and their perception of success (see FIG. 11).

Figure 12:
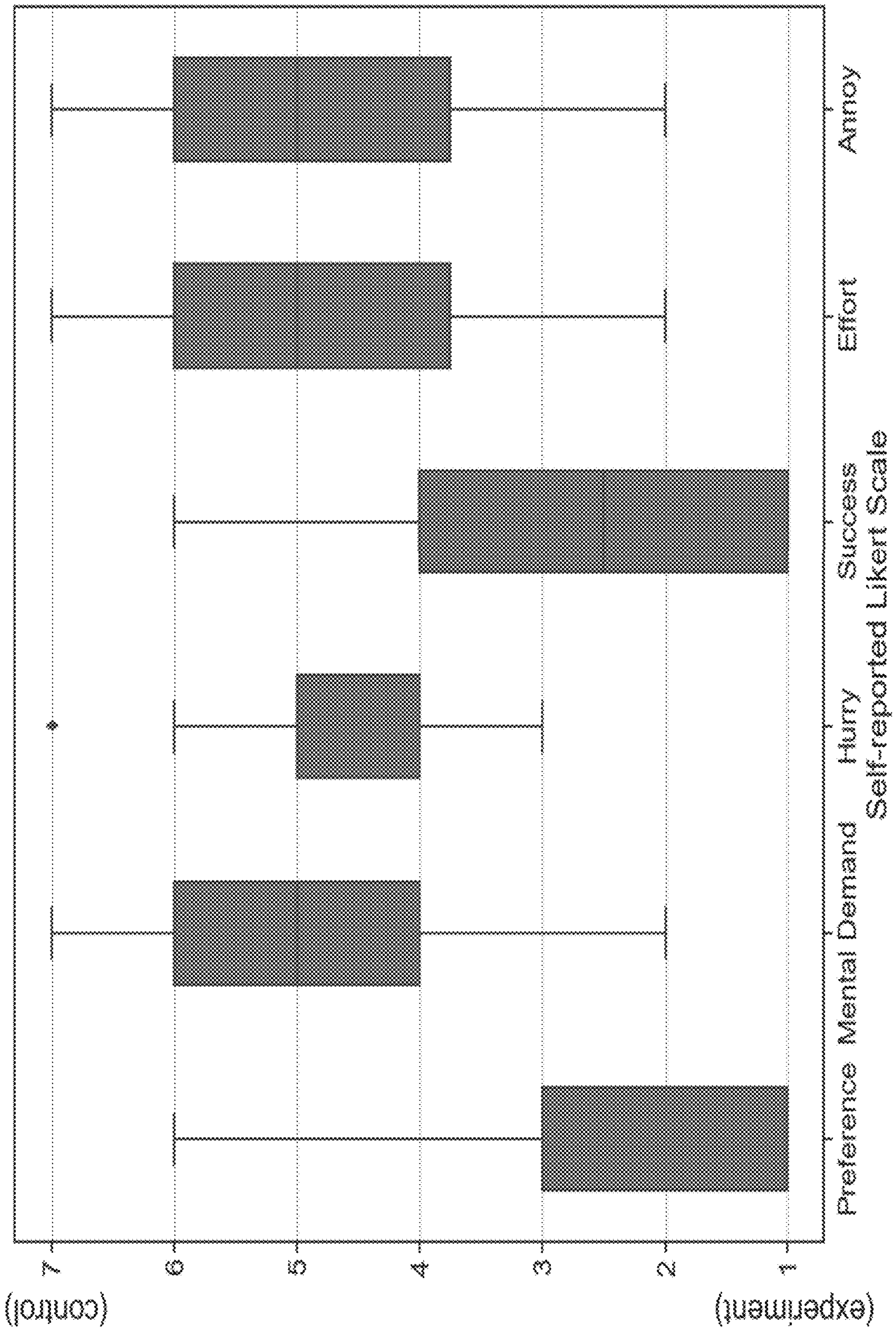
FIG. 12 illustrates, by way of example, a graph of the self-reported preference for a variety of parameters of completing the task with the tool provided for each condition.

In the post task survey where the participants directly compared their cognitive load between the two conditions (see Table 2 for questions), when using the UIDW tool, 80% of participants felt less mental demand, 83% of participants felt less hurried, 62% of participants felt more successful, 75% of participants spent less effort, and 75% of the participants felt less frustrated compared to when using UINL tool (see FIG. 12).

Figure 13:
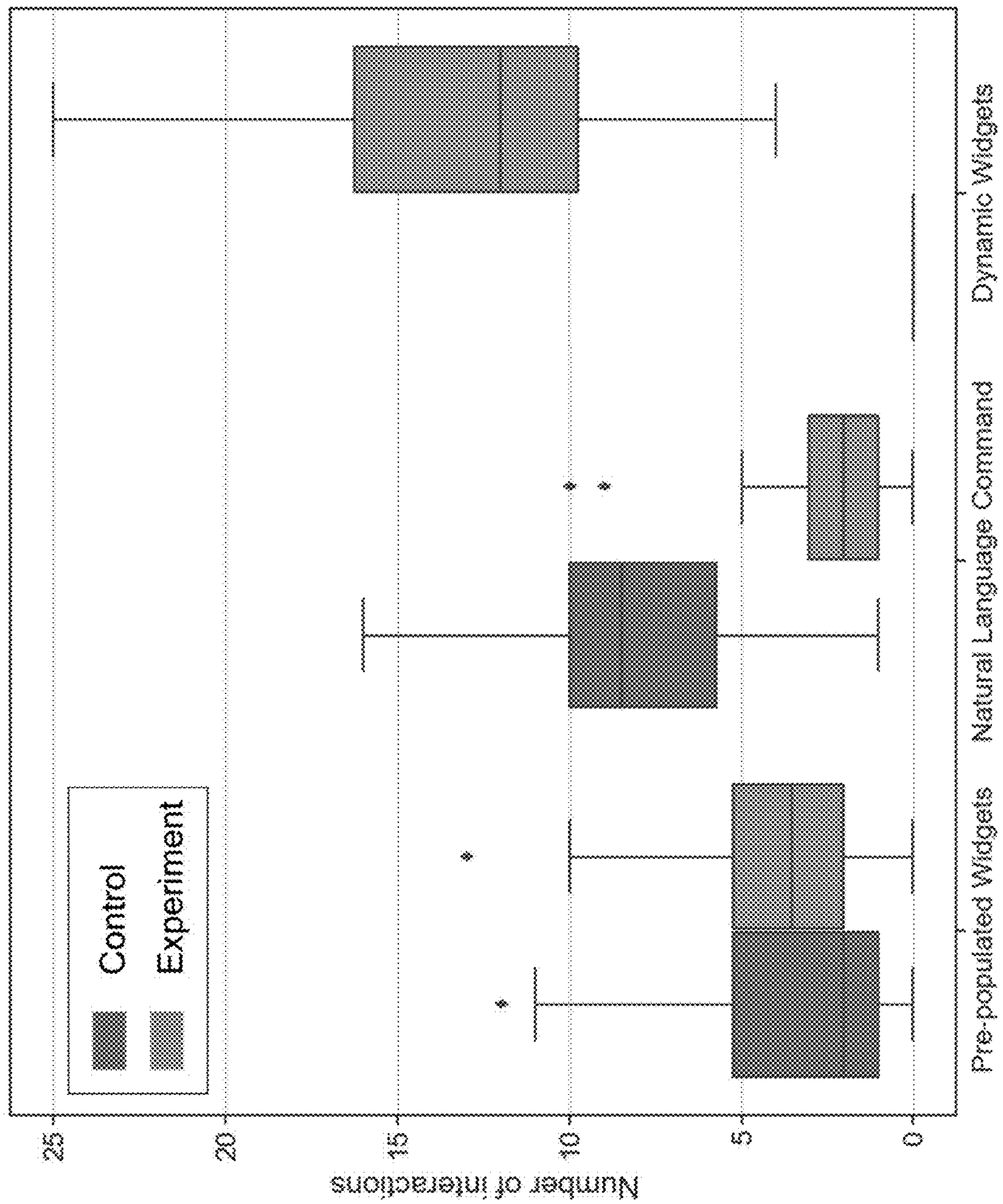
FIG. 13 illustrates, by way of example, usage data for the number of NL commands invoked by the participants, and the number of interactions with both dynamic widgets, and pre-populated widgets.

FIG. 13 illustrates, by way of example, usage data for the number of NL commands invoked by the participants, and the number of interactions with both dynamic widgets, and pre-populated widgets. In the UINL condition, participants used an average of 8.4 NL commands per task (including all subtasks) to edit the visualization. This usage significantly ($p<0.001$) decreased to just 2.67 NL commands when using the UIDW condition. This was indeed replaced by the dynamic widget usage, where participants on average used it 13.25 times when using the UIDW condition. This confirms an observation of an increase in the number of times participants fine-tuned when using UIDW condition. The widgets reduced the barrier to try out many different values before settling on the edits. For instance, P6 said "With dynamic widgets, I like how easy it is toggle or make edits in small increments and try out many different values. I can see what I'm clicking and have fine grained controls." There was no significant difference in usage of pre-populated widgets between the two conditions.

In the UINL condition, we observed two major strategies used by participants to perform the tasks.

Six of 24 participants (P7, P9, P12, P13, P15, P17) always used NL commands to edit the visualization irrespective of any pre-populated widgets available to perform the edit. Whereas, the other 18 participants first looked for a pre-populated widget to perform their edits before resorting to NL commands.

In the experiment condition UIDW, two major strategies were used by participants. Nine participants (P2, P3, P4, P5, P6, P8, P17, P18, P21) preferred to use only the widgets to make all the edits. These participants used the AI only to synthesize dynamic widgets without making the edits, and then chose to make the edits themselves by interacting with the synthesized widget. Ten participants (P7, P10, P12, P13, P16, P19, P20, P22, P23, P24) preferred to use the NL command to perform the broad edit, and then use the automatically synthesized dynamic widgets to make fine grained edits. P23 said "I would prefer to use the edit prompt for the first time, and use the dynamic widgets for further edits and adjustments". P15 chose to use only NL command to make the edits, and said "I think that [UINL] was easier to use. It is quite easy to make edits quickly using AI commands". The remaining participants used a combination of widgets and NL commands with no particular preference.

Participants when prompting to edit the chart generally provided their intent (goal) to the AI. For all the sub-tasks, they structured their prompt as [ACTION VERB]+ [CHART PROPERTY]+ [VALUE]. Some examples are "Change the stroke width to 5", "Rotate the x-axis labels to 65 deg", "change the x axis label to timeline".

However, we did notice a variety of natural language commands for filtering based sub-tasks (Tasks 1.3, 1.5, 2.3, 2.5, 3.4, 3.5). Some participants directly mentioned the values to keep. e.g., "show me finance and construction sectors only".

Some participants mentioned values to remove. e.g., "Remove everything other than MSFT and AAPL" or "Remove the plot for AAPL. Show me the variation of IBM". Some participants who weren't proficient with charting libraries used incorrect chart property names like "visibility of the strokes with only MSFT and AAPL selected", "remove all legend categories except construction and agriculture". In three such instances, model still performed the right filter transformation. For two instances, the model tried to modify the visibility resulting in an incorrect chart.

When prompting the AI for widgets, participants skip providing the value in the prompt, and directly manipulate it via the UI. Their prompt was generally structured as [ACTION VERB]+ [CHART PROPERTY]. Some examples are, "change x-axis limit", "change date range", "Change the x-axis max date". For instance, P3 said "Just an action along with the part of the chart that needed to be edited.". P23 said "I keep it as short as possible. Similar to [edit] commands, but without the data." In the next sub-section, evidence of how this makes prompting for a widget easier than using natural language command to directly edit the chart is provided. By taking advantage of data context, domain constraints, and clever prompt engineering using templates within the system 100, one can generate dynamic widgets with very less ambiguity with just simple instructions from users.

In the post task survey, the users were asked to rate their preference between the UINL and UIDW condition. All the participants except P15 (96%) strongly preferred using the system 100 compared to the baseline tool. The informal interview sheds light on the reasons.

Finding 1: Dynamic widgets makes repetitive edits easier. Sixteen participants (P1, P3, P4, P5, P6, P7, P9, P11, P13, P14, P17, P18, P19, P21, P22, P23) explicitly mentioned that dynamic widgets greatly reduced effort needed to perform repeated edits. By using dynamic widgets, they reduce the number of natural language commands they need to type-which is very time consuming. P5 said "I will rather just interact with the dynamic widgets. Compared to typing commands, I would just interact with an UI at the end of the day.". P7 commented "Once the widget was there for a certain type of task, I preferred using the widget as clicking is less cumbersome than articulating and typing." Moreover, when using dynamic widgets, participants interacted with the LLM only once when creating the widgets.

Subsequent edits are performed instantly when compared to using NL commands, where they have to wait for the response from the LLM 144 every time they have to perform an edit. P6 said, "Dynamic widgets were the foundation for the edits I made and I can do however many times I want. Faster than asking the AI again and again.". This also explains the increased usage of dynamic widgets mentioned elsewhere. Users using UIDW, tried a lot more values for exploratory sub-tasks since it was easier to repeat the edits, compared to using UINL.

Finding 2: Visual feedback enhances understanding and exploration. Nine participants (P2, P4, P5, P8, P11, P17, P18, P23, P24) mentioned they prefer using dynamic widgets due to the instant visual feedback the widgets provided when performing the edits. This visual feedback works both ways. First, when the user makes the edits using the dynamic widgets, the edits reflect on the chart immediately, since they are not waiting for a response from the LLM 144.

P23 summarizes this by saying "The real-time update with widgets, rather than waiting for AI, was super cool. I can interactively see what happens with the chart.". It is important to note that these visualizations are inherently static with no interactivity—but by creating dynamic widgets, participants are interacting with an inherently static visualization.

Second, the UI 104 provides a visual feedback by retaining the edit information in the state of the UI 104. P24 explains this by saying "with dynamic widgets, I can also visualize the changes. For example, if I change the color, i can just see the color there in the widget. That is very helpful, that is just efficient.". Dynamic widgets provide a clear visibility of chart (system) status, improving the visual feedback. In other words, dynamic widgets help users to overcome the usability challenge of the gulf of evaluation (understanding the system state).

Finding 3: Prompting to create dynamic widgets is easier and more reliable. FIG. 11 shows the participants self-reported score (Likert scale; higher is better) for how well the AI understood participants' intent. Participants using UIDW tool ($\mu$=6.04, $\sigma$=1.36 Likert scale) reported that AI understood their intent significantly better ($p$=0.024) than participants using UINL tool ($\mu$=4.95, $\sigma$=1.77 Likert scale). In fact, 18 of the 24 participants using UINL had at least one failed natural language edit command, and 8 of the 24 participants had more than 2 failed natural language edit commands. In contrast, only nine participants using UIDW had at least one erroneous widget, and no participant had more than 2 erroneous widget when performing the tasks.

Twelve participants (P1, P2, P3, P5, P6, P11, P14, P16, P17, P21, P22, P24) explicitly noted that it was easier and more reliable to prompt for dynamic widgets than to use just natural language to edit the visualization. For instance, P3 commented, "with [UINL] I had to provide my chat command as specific as possible to prevent errors. But with dynamic widgets in [UIDW] I didn't have to be very specific.". P6 commented to the reliability by saying "I like the ability to execute the edits using dynamic widget rather than leave it up to chance using the AI."

One probable reason for improved reliability could be: when using only natural language commands, the LLM 144 will have to generate the modified visualization specification for the whole chart in the response. This can increase the probability of errors, since it can potentially change in any other unrelated property in the specification. Whereas, when generating dynamic widgets, the model synthesizes a callback function that only edits one (or a few) properties of the visualization specification, greatly reducing the probability of errors.

Finding 4: Dynamic widgets enhance the sense of control over NL. Seven participants (P3, P5, P6, P8, P10, P16, P20) mentioned that using dynamic widgets provided them a greater sense of control over the outcome when making edits to the visualization. Users felt that the widgets provided a sense of structure to the edits performed, and sense of autonomy. P8 said "The widgets gave me a feeling of autonomy to make more changes compared to the AI. It had created some kind of structure for achieving the change.". Further, P6 said "typing the text commands was a little non-ideal. Not having the widgets made it feel like I don't control the edits. [natural language] commands made it feel like there was some level of uncertainty."

Finding 5: Dynamic widgets enable customization, but can be overwhelming for extended use. Nine participants (P1, P3, P6, P9, P10, P11, P16, P14, P18) mentioned they liked using dynamic widgets since it allowed customize their own UI to suit their editing intents. P7 said "The dynamic widgets are pretty cool. It's like writing a whole tool for yourself, but instead of writing code it is instantly available." Since the widgets were presented in the reverse chronological order of their creation, P18 said "I like dynamic widgets, because it sort of stores the history of edits I made. I can refer it back whenever I want to change it if I don't like.". Compared to traditional static UIs, dynamic interfaces are constantly changing. Five participants (P21, P17, P18, P8, P23) called out that creating dynamic widgets can get overwhelming over long editing sessions with widget panels constantly being changed, and wanted some way of either pausing widget creation or ability to categorize and control the widgets that are shown. For instance, P23 said "If I made a lot of them [dynamic widgets], then it might get tricky.

It'll be nice to have automatic grouping based on the kind of edits the widgets do." Similarly, P8 said "I would be nice to group, collapse or create multiple relevant and related widgets, just like Photoshop, to customize better." In contrast, P7 said "If it was a long series of tasks, I would maybe just prefer a stable interface.", and P15 said-"with [UIDW] I'm not sure how dynamic widgets are helpful. Using the commands was just simpler."

The system 100 employs one or two different modalities for users to specify the kinds of edits they want to make to the chart: NL commands and interaction through dynamic widgets. This design combines the strengths of both the modalities so the user can better communicate the intent to the AI agent and quickly make repeated precise edits to the visualization. This was reflected in the study by the participants' preference for the tool, and how they interacted with both the modalities.

One benefit of using NL command and dynamic widgets over traditional static UI is the ability to ease the gulf of execution. With static UI, the user has to know how and where to perform the edits, which can be cognitively demanding. Whereas, with NL interfaces and dynamic widgets, the users only need to specify their intent. The flip side of this argument is, despite the learning curve, overtime users will learn and get used to the static UIs. However, with dynamic UIs, the interface is constantly changing, which can potentially increase cognitive load for the user, especially in long editing sessions and for users with editing expertise. Some participants from the study did express this concern, and suggested to enable categorizing the widgets in a predictable way. Longer term usability study would provide insights to understand how constantly changing UI affects usability.

Another interesting is taking advantage of dynamic UI widgets' low programming requirement to turn end users into "no-code developers" with the ability to customize/DIY their interaction panels to augment static GUI. For example, with dynamic widgets, an end user can construct their own panel that best suit their daily tasks as shortcuts for complex tasks. For example, a user who often work on geographical data analysis can create a custom panel using dynamic widgets specially for map manipulation functions to reduce map editing efforts.

Dynamic widgets are designed around declarative high-level visualization grammar to enable compositional editing (e.g., VegaLite's JSON representation for visualization objects). The declarative syntax helps the widgets to be modular and be synthesized and used in any order the user wishes. Despite their advantages, high-level grammars expose less options than low-level grammars or imperative libraries for more complex visualization editing tasks (e.g., to make parts of a line dashed while the rest solid, would require visiting lower-level details of how lines are represented). To support editing of visualization in these low-level languages, the system 100 can be combined with bidirectional editing approaches which leverage program analysis and synthesis techniques to propagate surface-level edit requirements to edits over program structures or parameters.

Artificial Intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as classification, device behavior modeling (as in the present application) or the like. The NN 300, or other component or operation can include or be implemented using one or more NNs.

Many NNs are represented as matrices of weights (sometimes called parameters) that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph-if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The optimal operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights.

In some examples, initial weights may be randomly selected. Training data is fed into the NN, and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 14:
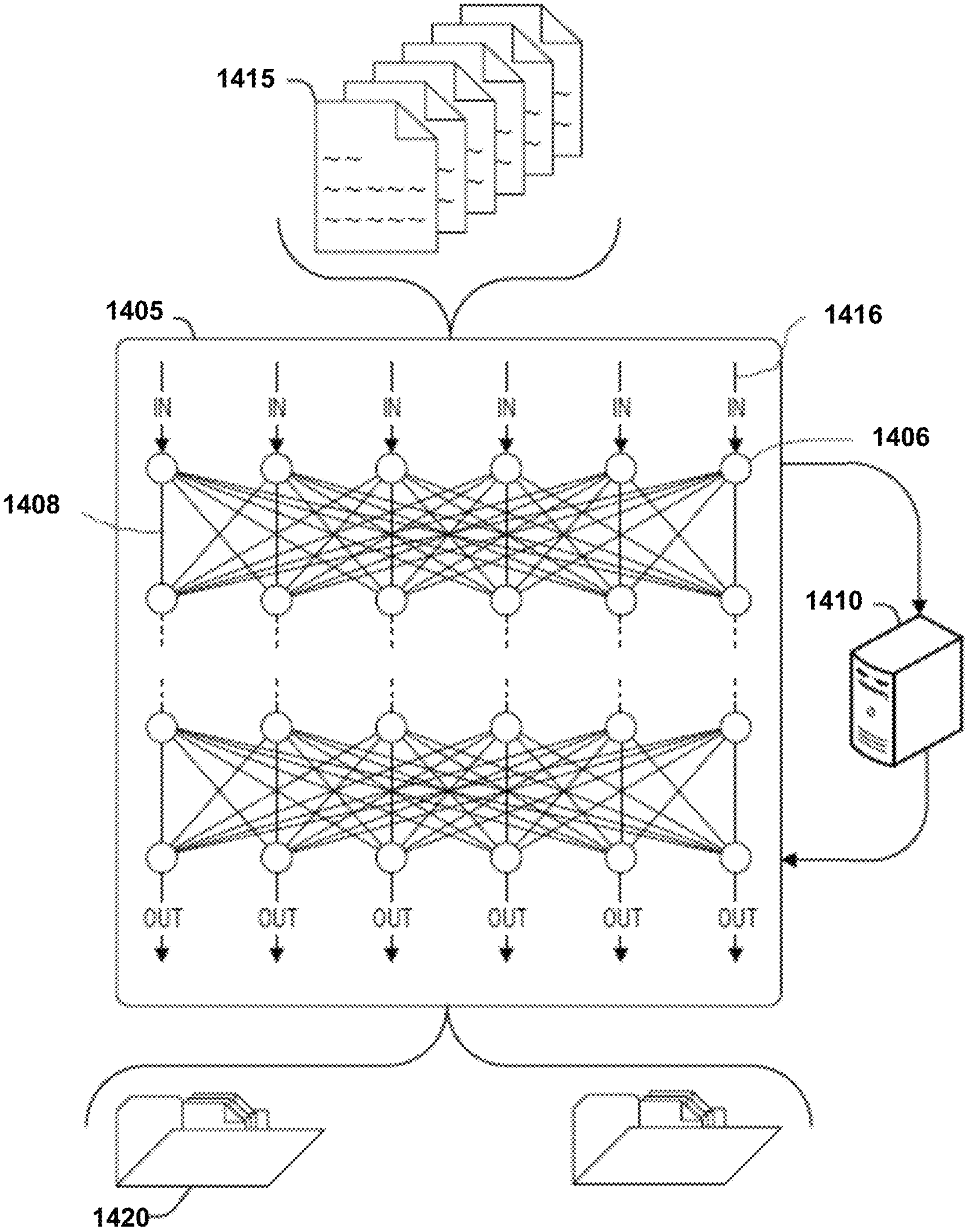
FIG. 14 is a block diagram of an example of an environment including a system for neural network (NN) training.

FIG. 14 is a block diagram of an example of an environment including a system for neural network (NN) training. The system includes an artificial NN (ANN) 1405 that is trained using a processing node 1410. The processing node 1410 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 1405, or even different nodes 1406 within layers. Thus, a set of processing nodes is arranged to perform the training of the ANN 1405. The LLM 144, data summarizer 106, chart engine 108, widget engine 110, another component, or a component thereof can be trained using the system.

The set of processing nodes is arranged to receive a training set 1415 for the ANN 1405. The ANN 1405 comprises a set of nodes 1406 arranged in layers (illustrated as rows of nodes 1406) and a set of inter-node weights 1408 (e.g., parameters) between nodes in the set of nodes. In an example, the training set 1415 is a subset of a complete training set. Here, the subset may enable processing nodes with limited storage resources to participate in training the ANN 1405.

The training data may include multiple numerical values representative of a domain, such as an image feature, or the like. Each value of the training or input 1416 to be classified after ANN 805 is trained, is provided to a corresponding node 1406 in the first layer or input layer of ANN 805. The values propagate through the layers and are changed by the objective function.

As noted, the set of processing nodes is arranged to train the neural network to create a trained neural network. After the ANN is trained, data input into the ANN will produce valid classifications 1420 (e.g., the input data 1416 will be assigned into categories), for example. The training performed by the set of processing nodes 806 is iterative. In an example, each iteration of the training the ANN 1405 is performed independently between layers of the ANN 1405. Thus, two distinct layers may be processed in parallel by different members of the set of processing nodes. In an example, different layers of the ANN 1405 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 1406 (e.g., neurons) are trained independently. In an example, the nodes are trained on different hardware.

Figure 15:
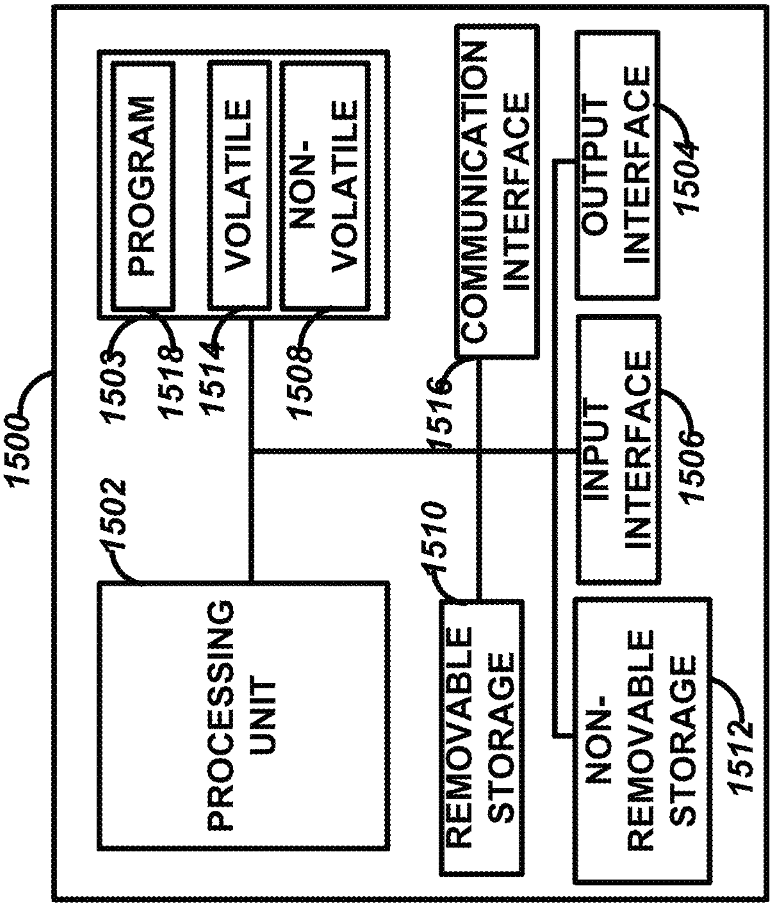
FIG. 15 is a block schematic diagram of a computer system to perform search request routing, and for performing methods and algorithms according to example embodiments.

FIG. 15 is a block schematic diagram of a computer system 1500 to perform search request routing, and for performing methods and algorithms according to example embodiments. Any of the components or operations of the system 100, UI 104, data summarizer 106, chart engine 108, widget engine 110, LLM 144, visualizer 114, transformer 116, widget 118, or other component or operation can be implemented using the system 1500 or a component thereof. All components of the system 1500 need not be used in various embodiments.

One example computing device in the form of a computer 1500 may include a processing unit 1502, memory 1503, removable storage 1510, and non-removable storage 1512. Although the example computing device is illustrated and described as computer 1500, the computing device may be in different forms in different embodiments. For example, the computing device may instead be a smartphone, a tablet, smartwatch, smart storage device (SSD), or other computing device including the same or similar elements as illustrated and described with regard to FIG. 15. Devices, such as smartphones, tablets, and smartwatches, are generally collectively referred to as mobile devices or user equipment.

Although the various data storage elements are illustrated as part of the computer 1500, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 1503 may include volatile memory 1514 and non-volatile memory 1508. Computer 1500 may include—or have access to a computing environment that includes—a variety of computer-readable media, such as volatile memory 1514 and non-volatile memory 1508, removable storage 1510 and non-removable storage 1512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1500 may include or have access to a computing environment that includes input interface 1506, output interface 1504, and a communication interface 1516. Output interface 1504 may include a display device, such as a touchscreen, that also may serve as an input device. The input interface 1506 may include one or more of a touchscreen, touchpad, mouse, keyboard, camera, one or more device-specific buttons, one or more sensors integrated within or coupled via wired or wireless data connections to the computer 1500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1500 are connected with a system bus 1520.

Computer-readable instructions stored on a computer-readable medium are executable by the processing unit 1502 of the computer 1500, such as a program 1518. The program 1518 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN).

Examples and Additional Notes

Example 1 includes a method comprising receiving, by a user through a user interface (UI), data indicating a dataset of structured data, displaying, by the UI, the data on a chart, receiving, by the UI, a request from the user to alter a representation of the data on the chart, dynamically synthesizing a widget operable to alter the representation of the data on the chart based on user interaction with the widget, presenting, by the UI, the widget on the UI alongside the chart, and altering, based on user interaction with the widget, the chart.

In Example 2, Example 1 further includes, wherein dynamically synthesizing the widget includes prompting a large language model (LLM) to fill in code of code templates resulting in templates with completed code.

In Example 3, Example 2 further includes, wherein the templates with complete code include visualization code that defines how the widget appears on the UI, and callback function code that calls a visualization specification of the chart and the visualization code.

In Example 4, at least one of Examples 1-3 further includes, wherein the request is provided in natural language through a widget input control.

In Example 5, Example 4 further includes, wherein the request is provided in natural language through an input control and the request further indicates a modification to the chart.

In Example 6, Example 5 further includes concurrently performing the modification to the chart along with presentation of the widget on the UI.

In Example 7, at least one of Examples 2-6 further includes pre-processing the dataset resulting in a data summary, and wherein prompting the LLM further includes providing the code templates along with the data summary to the LLM.

In Example 8, Example 7 further includes, wherein prompting the LLM further includes providing few shot examples along with the prompt.

Example 9 includes a system comprising a user interface (UI) configured to receive, by a user, data indicating a dataset of structured data, display a representation of the data on a chart, receive a request from the user to alter a representation of the data on the chart, and issue a command to dynamically synthesize a widget operable to alter the representation of the data on the chart based on user interaction with the widget, a widget engine configured to receive the command, generate a prompt to generate the widget based on the command and the dataset, issue the prompt to a large language model (LLM), and receive the widget from the LLM, the UI further configured to present the widget alongside the chart, and a chart engine configured to alter, based on user interaction with the widget on the UI, the chart.

In Example 10, Example 9 further includes, wherein the prompt asks the LLM to fill in code of code templates resulting in templates with completed code.

In Example 11, Example 10 further includes, wherein the templates with complete code include visualization code that defines how the widget appears on the UI, and callback function code that calls a visualization specification of the chart and the visualization code.

In Example 12, at least one of Examples 9-11 further includes, wherein the request is provided in natural language through a widget input control of the UI.

In Example 13, Example 12 further includes, wherein the request is provided in natural language through an input control and the request further indicates a modification to the chart.

In Example 14, Example 13 further includes, wherein the chart engine concurrently performs the modification to the chart along with presentation of the widget on the UI.

In Example 15, at least one of Examples 10-14 further includes a data summarizer configured to pre-process the dataset resulting in a data summary, and wherein prompting the LLM further includes providing the code templates along with the data summary to the LLM.

In Example 16, Example 15 further includes, wherein prompting the LLM further includes providing few shot examples along with the prompt.

Example 17 includes a non-transitory machine-readable medium including instructions that, when executed by a machine, cause the machine to perform operations for dynamically synthesized widgets, the operations comprising receiving, by a user through a user interface (UI), data indicating a dataset of structured data, displaying, by the UI, a representation of the data on a chart, receiving, by the UI, a request from the user to alter a representation of the data on the chart, issuing, by the UI, a command to dynamically synthesize a widget operable to alter the representation of the data on the chart based on user interaction with the widget, receiving, by a widget engine, the command, generating, by the widget engine, a prompt to generate the widget based on the command and the dataset, issuing, by the widget engine, the prompt to a large language model (LLM), receiving the widget from the LLM, presenting, by the UI, the widget alongside the chart, and altering, by a chart engine and based on user interaction with the widget on the UI, the chart.

In Example 18, Example 17 further includes, wherein the prompt asks the LLM to fill in code of code templates resulting in templates with completed code and the templates with complete code include visualization code that defines how the widget appears on the UI, and callback function code that calls a visualization specification of the chart and the visualization code.

In Example 19, Example 18 further includes receiving, from a data summarizer configured to pre-process the dataset, a data summary of the dataset, and wherein prompting the LLM further includes providing the code templates along with the data summary to the LLM.

In Example 20, Example 19 further includes, wherein prompting the LLM further includes providing few shot examples along with the prompt.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine. Thus, a module can include software, hardware that executes the software or is configured to implement a function without software, firmware, or a combination thereof.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, “processor,” may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, “article of manufacture,” as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:

receiving, by a user through a user interface (UI), data indicating a dataset of structured data;

displaying, by the UI, the data on a chart;

receiving, by the UI, a request from the user to alter a representation of the data on the chart including an initial chart-design edit of the chart;

dynamically synthesizing a widget operable to directly alter the representation of the data on the chart based on user interaction with the widget, the widget including a visualization specification and a callback function, the visualization specification including a script that defines how the widget is displayed on the UI, the callback function including code that is executed responsive to the user interacting with the widget, and the code translating user inputs provided through user interaction with the widget to visualization properties of the chart, the dynamically synthesizing including:

issuing a prompt to a large language model (LLM), the prompt including a first code template for the visualization specification, a second code template for the callback function, and a current chart visualization specification; and receiving, from the LLM, the visualization specification and the callback function as filled in versions of the first and second code templates for the visualization specification and the callback function, respectively;

presenting, by the UI, the widget on the UI alongside the chart with the initial chart-design edit; and altering, based on user interaction with the widget and by calling the callback function with input populated based on the user interaction, the chart, resulting in an altered chart.

2. The method of claim 1, wherein the request is provided in natural language through a widget input control.

3. The method of claim 1, the code further providing an ordered list of transform objects executed using the widget, the method further comprising:

concurrently performing the initial chart-design edit to the chart along with presentation of the widget on the UI and executing the transform objects in chronological order across widgets before rendering to generate the altered chart.

4. The method of claim 3, further comprising providing, by the UI, an enable/disable control for each transform contributed by a widget and wherein the transform objects are included based on a state of the enable/disable control.

5. The method of claim 1, further comprising:

pre-processing the dataset resulting in a data summary; and wherein prompting the LLM further includes providing the first and second code templates along with the data summary to the LLM.

6. The method of claim 5, wherein prompting the LLM further includes providing few shot examples along with the prompt.

7. A system comprising:

processing circuitry;

a display;

a user interface (UI), provided on the display by the processing circuitry, the UI configured to:

receive, by a user, data indicating a dataset of structured data;

display a representation of the data on a chart;

receive a request from the user to alter a representation of the data on the chart including an initial chart-design edit of the chart; and issue a command to dynamically synthesize a widget operable to directly alter the representation of the data on the chart based on user interaction with the widget;

a widget engine configured to:

receive the command;

generate a prompt to generate the widget based on the command and the dataset, the prompt including a first code template for a visualization specification, a second code template for a callback function and a current chart visualization specification;

issue the prompt to a large language model (LLM); and receive the widget from the LLM, the widget including the visualization specification and the callback function as filled in versions of the first and second code templates for the visualization specification and the callback function, respectively, the visualization specification including a script that defines how the widget is displayed on the UI, the callback function including code that is executed responsive to the user interacting with the widget, and the code translating user inputs provided through user interaction with the widget to visualization properties of the chart;

the UI further configured to present the widget alongside the chart with the initial chart-design edit; and a chart engine configured to alter, based on user interaction with the widget on the UI and by calling the callback function with input populated based on the user interaction, the chart, resulting in an altered chart.

8. The system of claim 7, wherein the request is provided in natural language through a widget input control of the UI.

9. The system of claim 7, wherein the chart engine concurrently performs the initial chart-design edit to the chart along with presentation of the widget on the UI.

10. The system of claim 7, further comprising:

a data summarizer configured to pre-process the dataset resulting in a data summary; and wherein prompting the LLM further includes providing the first and second code templates along with the data summary to the LLM.

11. The system of claim 10, wherein prompting the LLM further includes providing few shot examples along with the prompt.

12. A non-transitory machine-readable medium including instructions that, when executed by a machine, cause the machine to perform operations for dynamically synthesized widgets, the operations comprising:

receiving, by a user through a user interface (UI), data indicating a dataset of structured data;

displaying, by the UI, a representation of the data on a chart;

receiving, by the UI, a request from the user to alter a representation of the chart including an initial chart-design edit of the chart;

issuing, by the UI, a command to dynamically synthesize a widget operable to alter the representation of the data on the chart based on user interaction with the widget;

receiving, by a widget engine, the command;

generating, by the widget engine, a prompt to generate the widget based on the command and the dataset, the prompt including a first code template for a visualization specification, a second code template for a callback function, and a current chart visualization specification;

issuing, by the widget engine, the prompt to a large language model (LLM);

receiving the widget from the LLM, the widget including the visualization specification and the callback function as filled in versions of the first and second code templates for the visualization specification and the callback function, respectively, the visualization specification including a script that defines how the widget is displayed on the UI, the callback function including code that is executed responsive to the user interacting with the widget, and the code translating (i) the visualization specification altered through user interaction with the widget and (ii) the chart to an altered chart;

presenting, by the UI, the widget alongside the chart with the initial chart-design edit;

altering, by a chart engine and based on user interaction with the widget on the UI and by calling the callback function with input populated based on the user interaction and the chart with the initial chart-design edit, the chart, resulting in the altered chart.

13. The non-transitory machine-readable medium of claim 12, further comprising:

receiving, from a data summarizer configured to pre-process the dataset, a data summary; and wherein prompting the LLM further includes providing the code templates along with the data summary to the LLM.

14. The non-transitory machine-readable medium of claim 13, wherein prompting the LLM further includes providing few shot examples along with the prompt.

* * * * *